United States Patent
Forsman et al.

(10) Patent No.: US 9,363,099 B2
(45) Date of Patent: Jun. 7, 2016

(54) UPNP/DLNA WITH RADA HIVE

(75) Inventors: Bob Forsman, Sugar Hill, GA (US); Charles Dasher, Lawrenceville, GA (US); Chris Phillips, Hartwell, GA (US); Jennifer Reynolds, Duluth, GA (US)

(73) Assignee: ERICSSON AB, Stockholm (SE)

( * ) Notice: Subject to any disclaimer, the term of this patent is extended or adjusted under 35 U.S.C. 154(b) by 1015 days.

(21) Appl. No.: 13/536,133

(22) Filed: Jun. 28, 2012

(65) Prior Publication Data

US 2013/0151684 A1 Jun. 13, 2013

Related U.S. Application Data

(60) Provisional application No. 61/607,675, filed on Mar. 7, 2012, provisional application No. 61/570,095, filed on Dec. 13, 2011.

(51) Int. Cl.
*G06F 15/173* (2006.01)
*H04L 12/28* (2006.01)
*H04L 29/08* (2006.01)

(52) U.S. Cl.
CPC ........ *H04L 12/2807* (2013.01); *H04L 12/2834* (2013.01); *H04L 67/141* (2013.01); *H04L 67/16* (2013.01); *H04L 2012/2849* (2013.01)

(58) Field of Classification Search
CPC ... H04L 12/2834; H04L 67/141; H04L 67/16; H04L 12/2807; H04L 2012/28494
USPC ........................................................ 709/223
See application file for complete search history.

(56) References Cited

U.S. PATENT DOCUMENTS

| | | | | |
|---|---|---|---|---|
| 6,167,513 A * | 12/2000 | Inoue | .................. | H04L 63/0428 380/255 |
| 6,236,983 B1 * | 5/2001 | Hofmann | ............... | G06N 5/043 706/46 |
| 2002/0161904 A1 * | 10/2002 | Tredoux | .............. | H04L 63/0281 709/229 |
| 2004/0103311 A1 * | 5/2004 | Barton | ................ | H04L 63/0209 726/8 |
| 2005/0229245 A1 * | 10/2005 | Nakano | ............... | H04L 12/2803 726/14 |
| 2006/0200572 A1 * | 9/2006 | Schcolnik | ........... | H04L 63/0236 709/230 |
| 2008/0112374 A1 * | 5/2008 | Ramankutty | ......... | H04W 28/08 370/338 |
| 2009/0052416 A1 * | 2/2009 | Kumazawa | ............. | H04L 45/00 370/338 |
| 2009/0210555 A1 * | 8/2009 | Han | ...................... | H04L 12/283 709/238 |
| 2010/0115074 A1 * | 5/2010 | Tapiola | .................... | H04L 12/12 709/223 |
| 2010/0226338 A1 * | 9/2010 | Aso | ..................... | H04W 60/005 370/331 |
| 2010/0228818 A1 * | 9/2010 | Han | ...................... | H04L 12/281 709/203 |
| 2010/0329126 A1 | 12/2010 | van Gassel et al. | | |
| 2011/0320572 A1 | 12/2011 | Damola | | |
| 2012/0158900 A1 * | 6/2012 | Kim | .................... | H04L 12/6418 709/217 |
| 2014/0020067 A1 * | 1/2014 | Kim | .................... | H04L 63/0861 726/4 |
| 2014/0280774 A1 * | 9/2014 | Kaminushi | ............. | H04L 67/06 709/219 |
| 2015/0135326 A1 * | 5/2015 | Bailey, Jr. | ............. | G06F 21/577 726/25 |
| 2015/0142896 A1 * | 5/2015 | Buchanan | ............... | H04L 51/02 709/206 |

OTHER PUBLICATIONS

Fasbender, et al. Virtually at Home: High-Performance Access to Personal Media. Ericsson Review No. 2, 2008. pp. 58-63.

(Continued)

*Primary Examiner* — Anthony Mejia

(57) ABSTRACT

A system, a controller, and methods are described herein for enabling a user of a user device while located in a visited local area network (e.g., their friend's local area network) to remotely access a device which is located within a home local area network (e.g., their household local area network).

11 Claims, 22 Drawing Sheets

(56) References Cited

OTHER PUBLICATIONS

Russell, et al. Remote Access Architecture: 2. For UPnP™ Version 1.0. Apr. 30, 2011.

Belimpasakis, et al.: Remote Access to Universal Plug and Play (UPnP) Devices Utilizing the Atom Publishing Protocol. Jun. 2007.

* cited by examiner

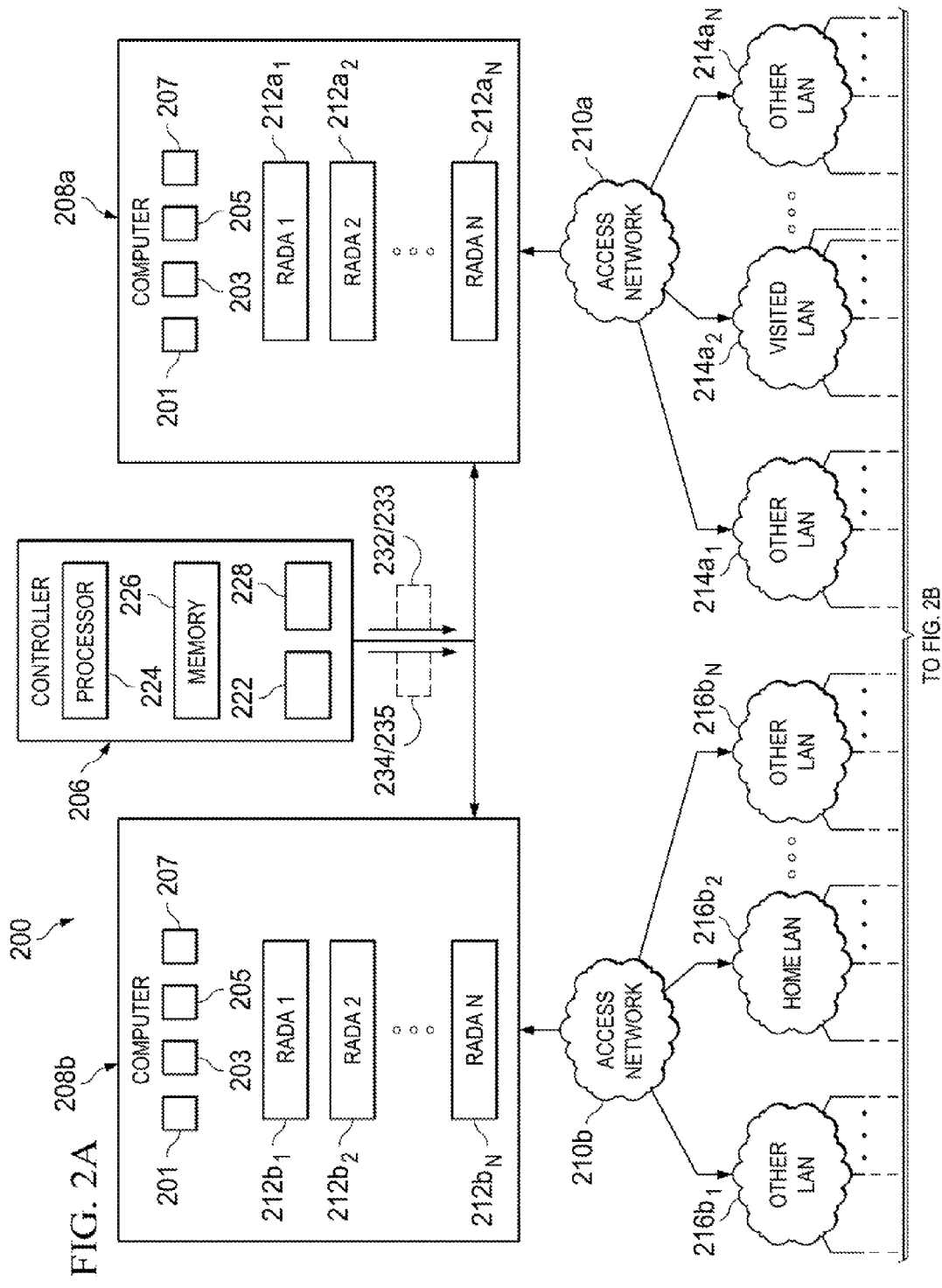

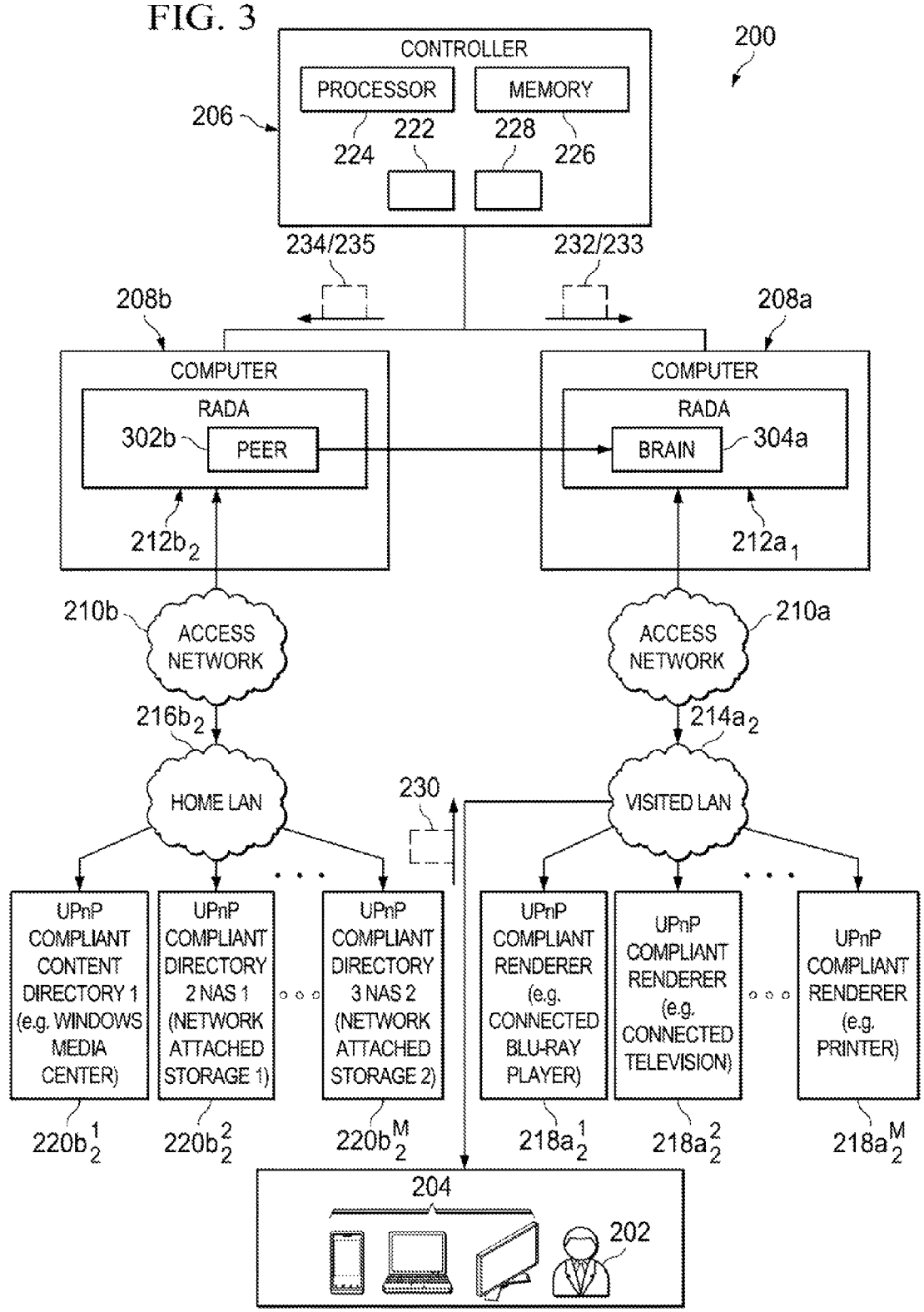

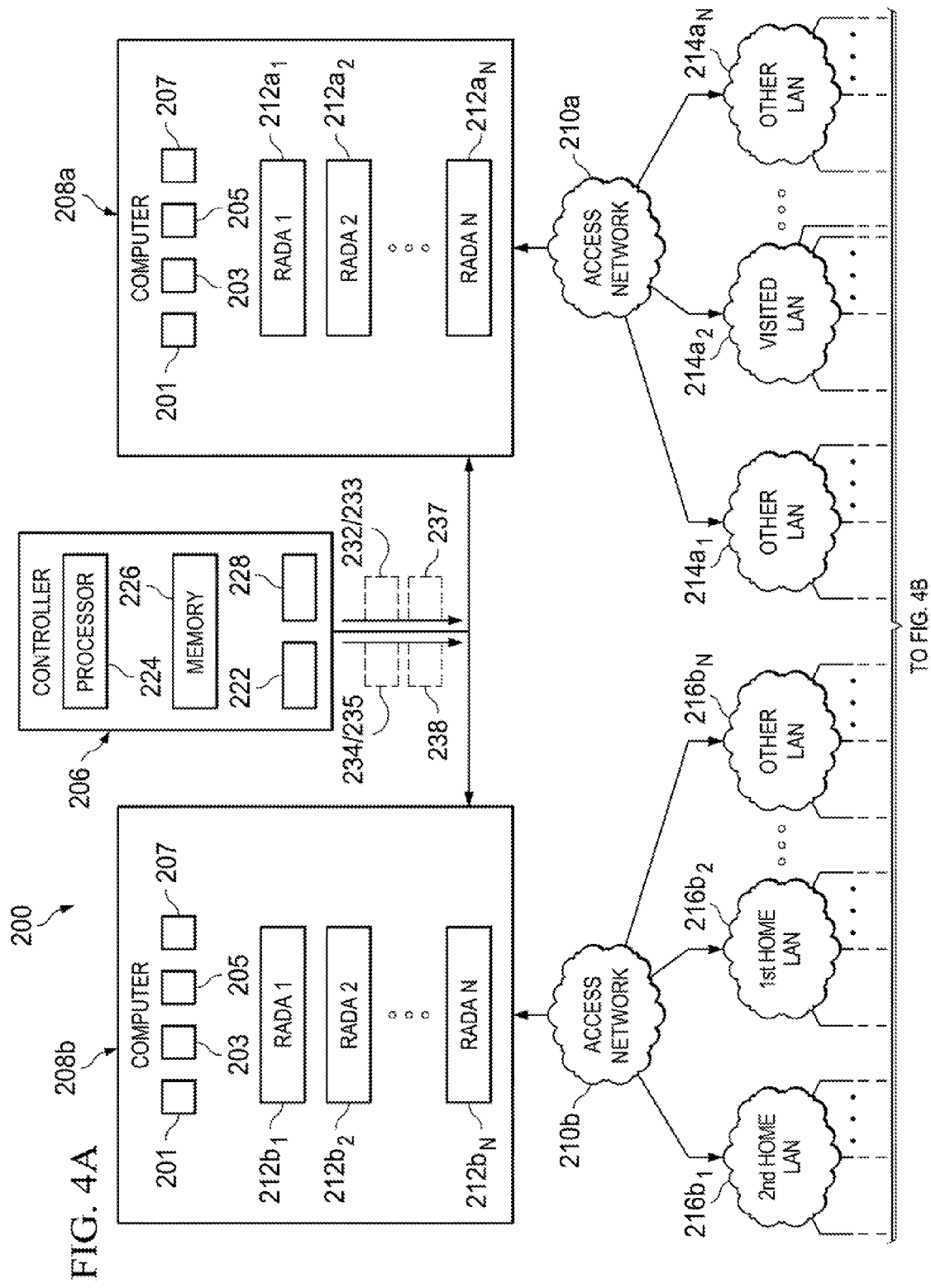

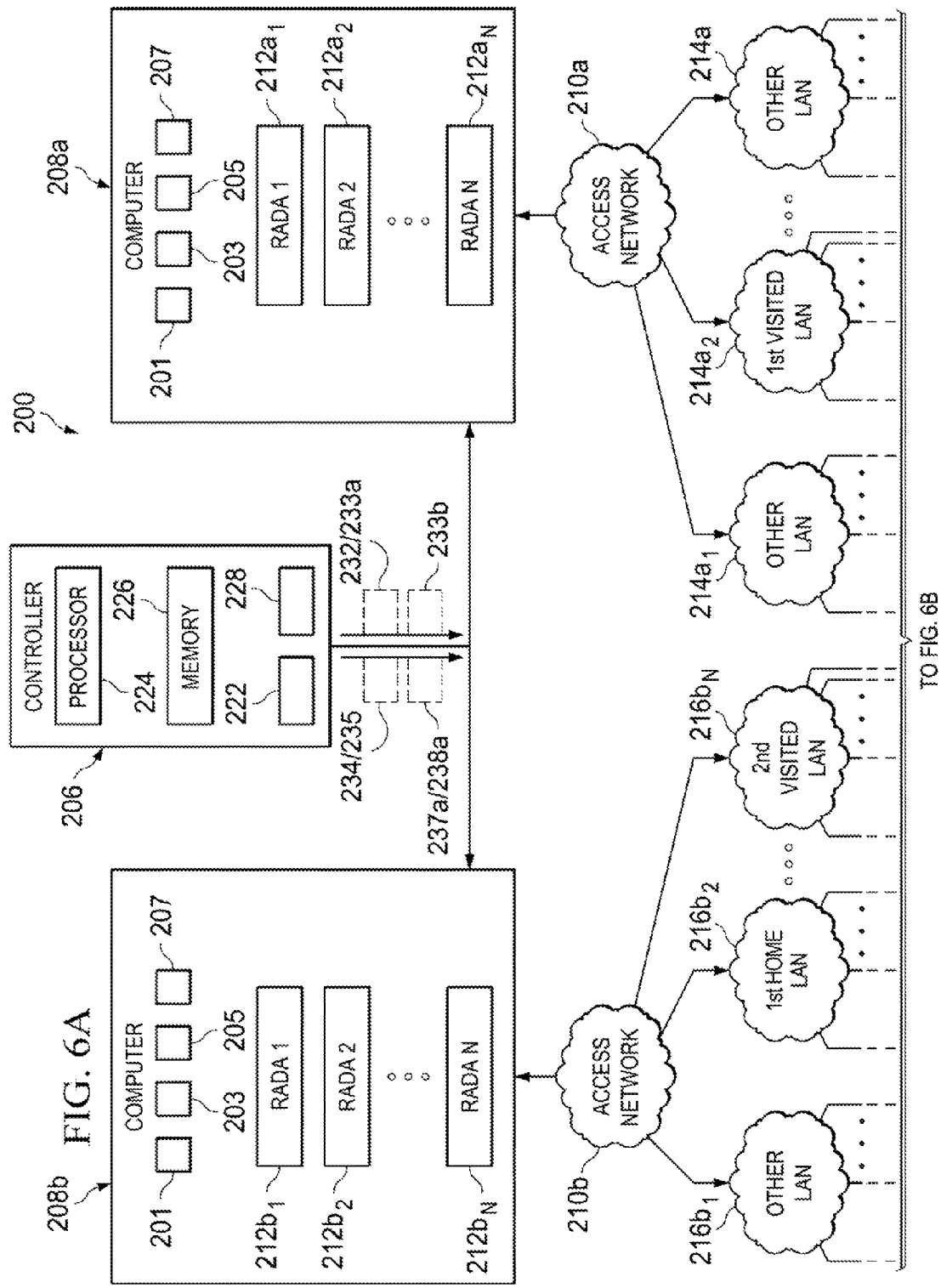

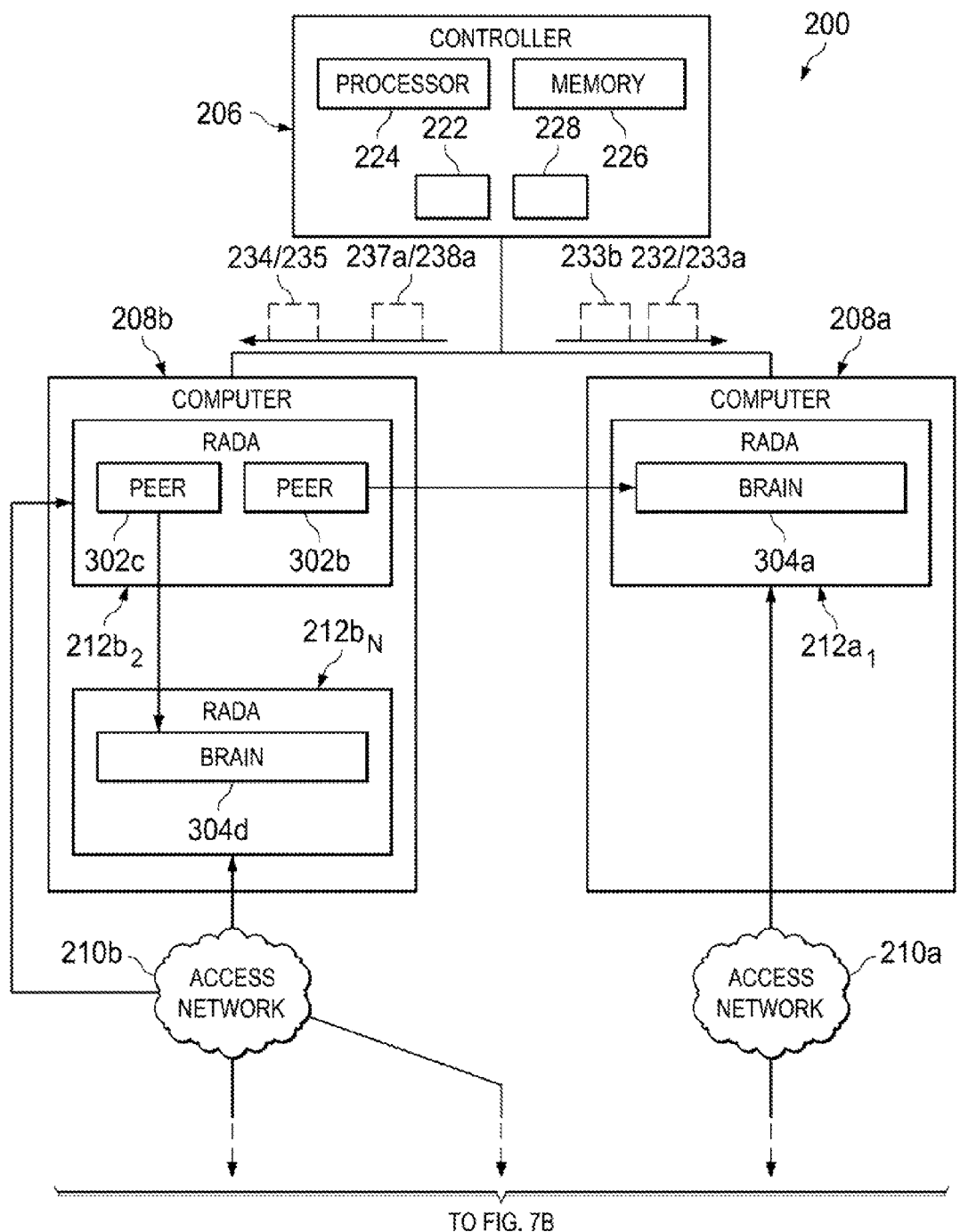

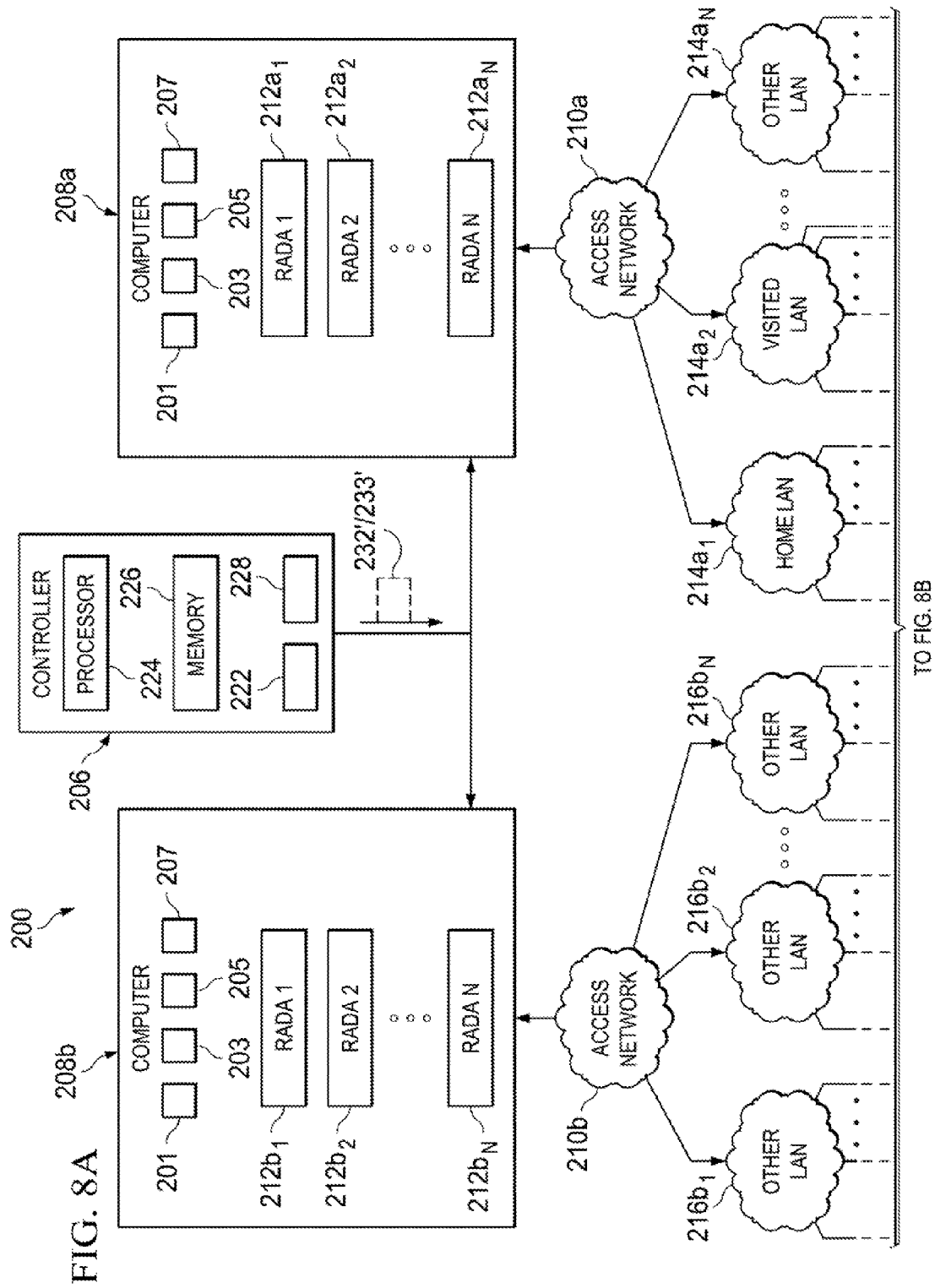

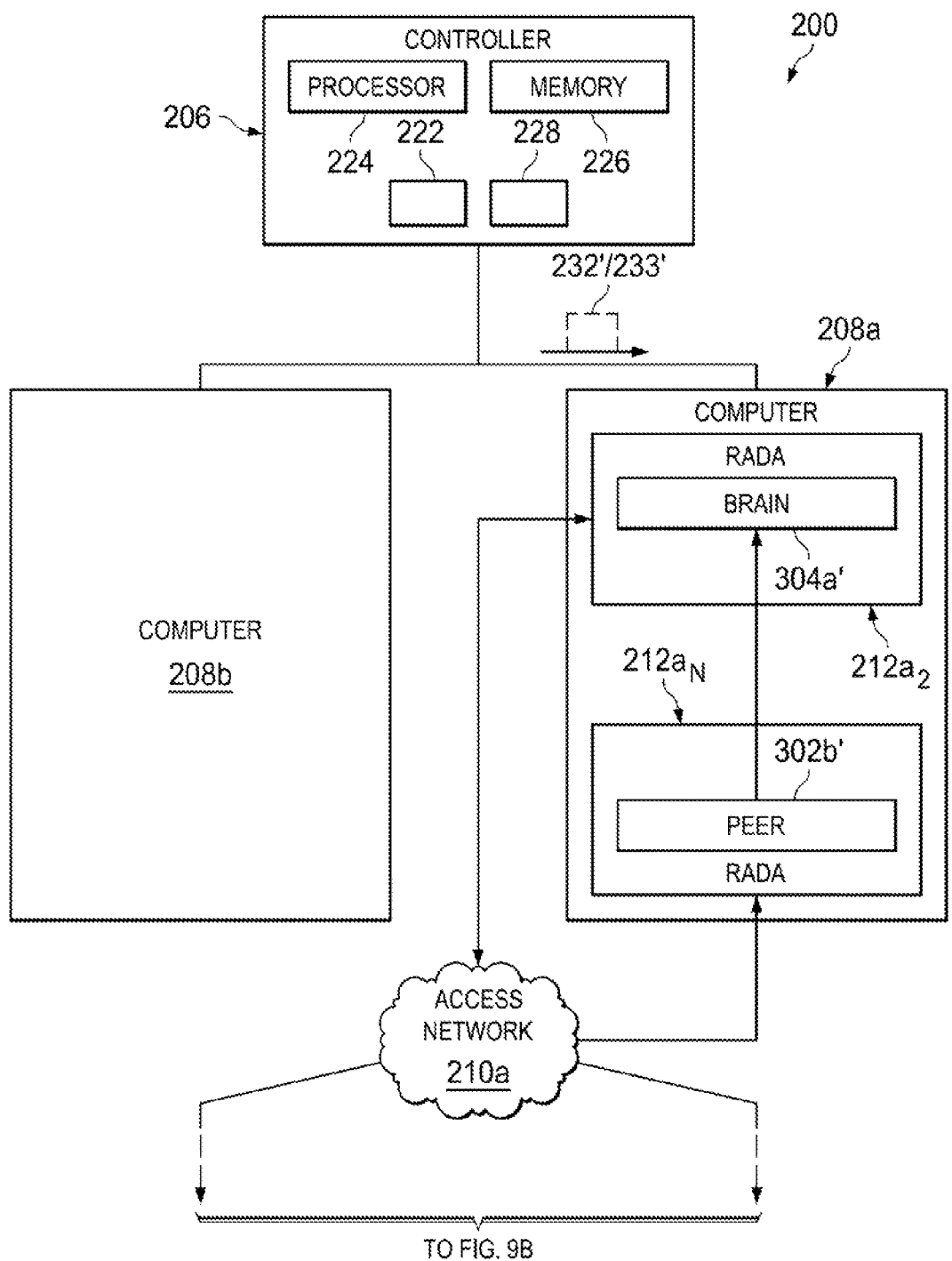

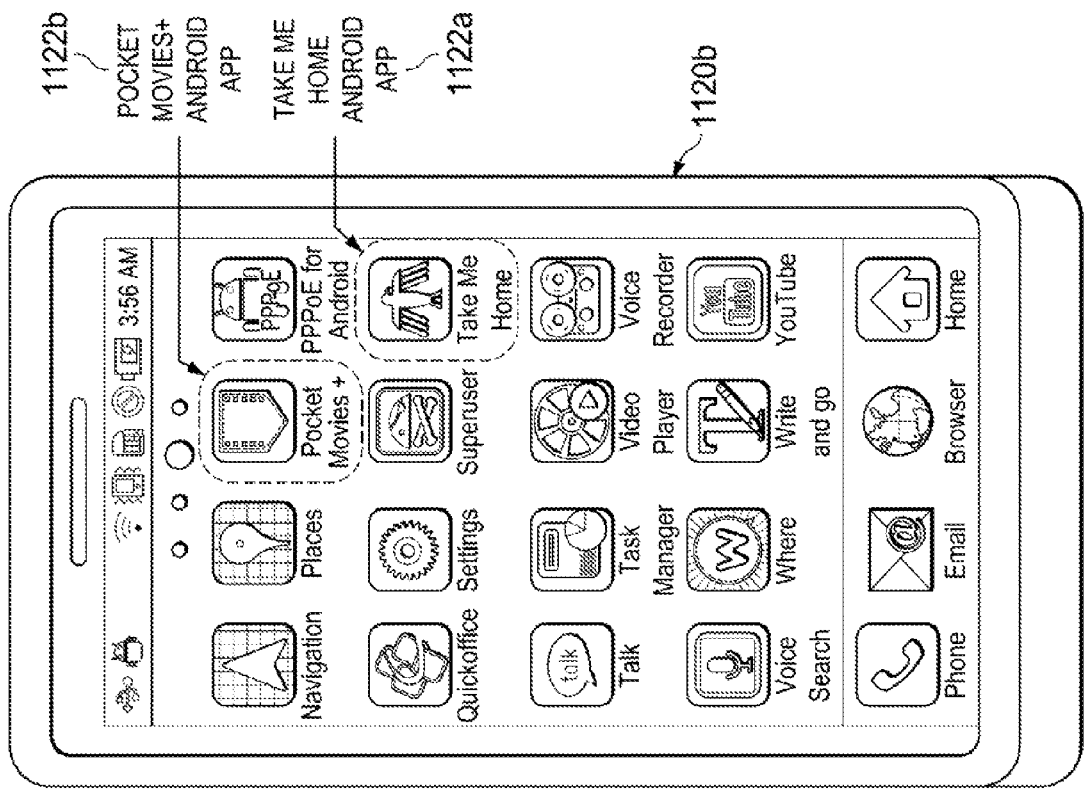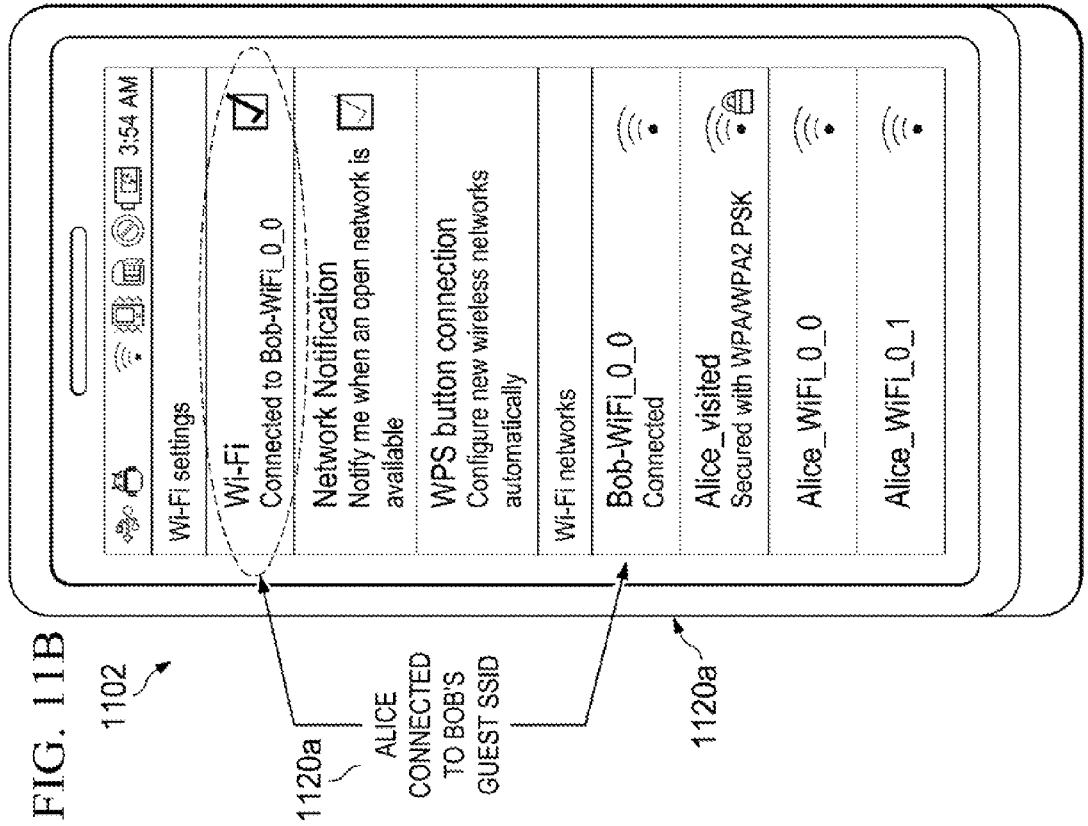
FIG. 11B

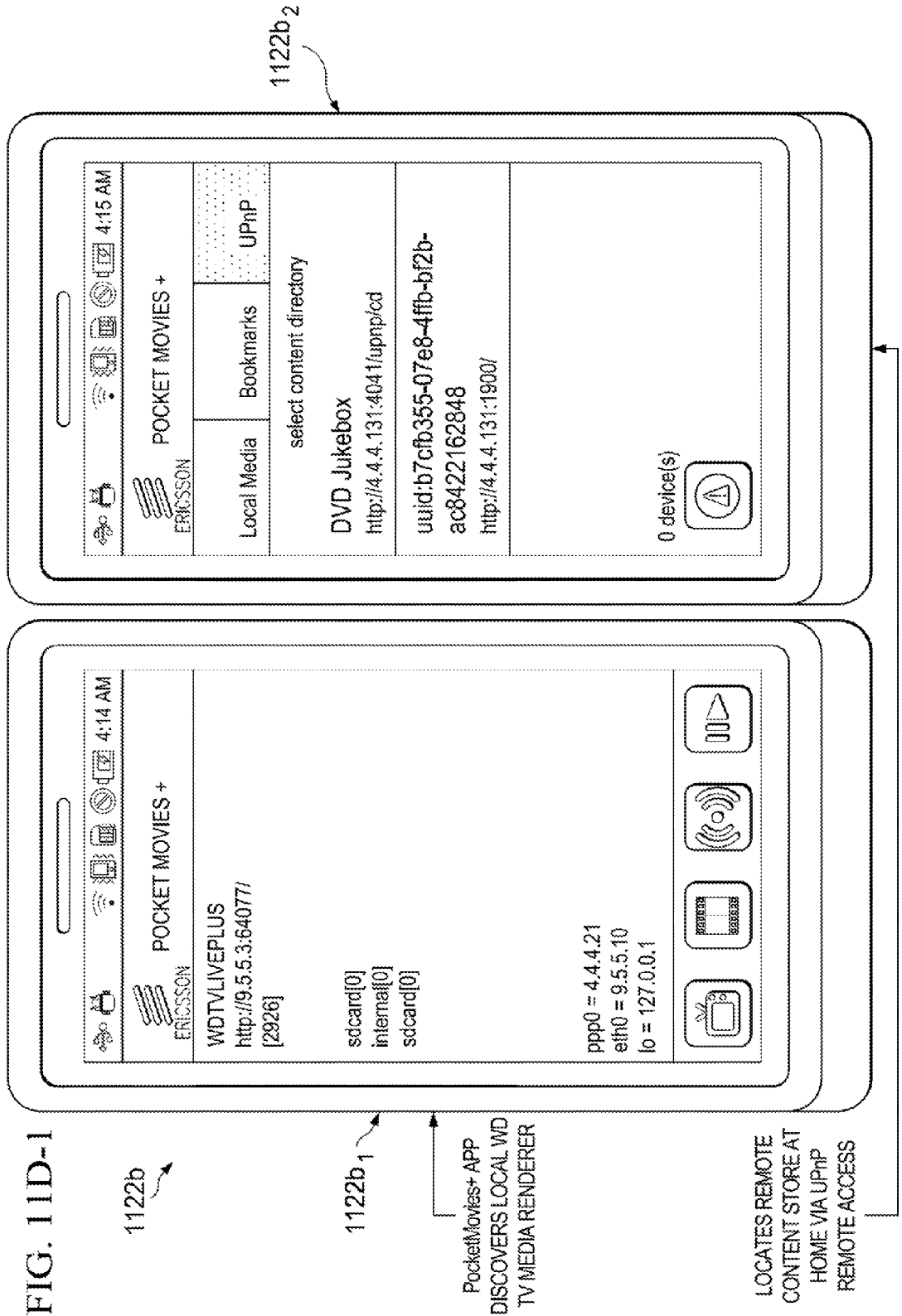

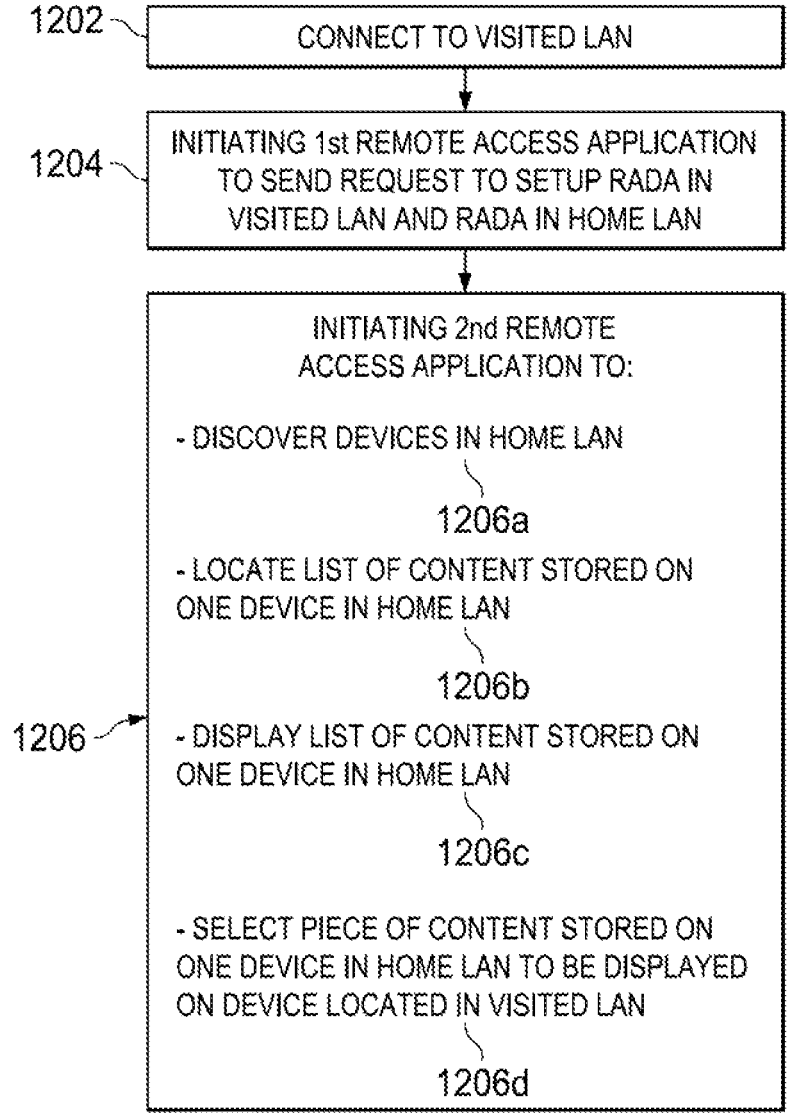

UPNP/DLNA WITH RADA HIVE

CLAIM OF PRIORITY

This application claims the benefit of U.S. Provisional Application Ser. No. 61/570,095 filed on Dec. 13, 2011. In addition, this application claims the benefit of U.S. Provisional Application Ser. No. 61/607,675 filed on Mar. 7, 2012. The contents of these documents are hereby incorporated by reference herein.

TECHNICAL FIELD

The present invention relates to a system, a controller, and methods for enabling a user of a user device while located in a visited local area network (e.g., their friend's local area network) to remotely access a device which is located within a home local area network (e.g., their household local area network).

BACKGROUND

Television sets, set-top boxes, game consoles, stereos, cameras and other entertainment appliances now routinely come with built-in communications capabilities that enable them to upload, download, and display data from other devices which are located within the home. The Digital Living Network Alliance (DLNA), for example, develops device interworking profiles for home-based media-sharing services. Now widely accepted in the industry, with more than 100 devices being certified each month, DLNA will soon enable interworking for all sorts of devices utilizing the home local area network (LAN). The DLNA is based on the Universal Plug and Play (UPnP) family of standards. The UPnP is a set of networking protocols which permits networked devices, such as personal computers, printers, Internet gateways, Wi-Fi access points and mobile devices to seamlessly discover each other's presence on the network and establish functional network services for data sharing, communications, and entertainment. The UPnP also standardizes other services, such as the control of home appliances.

Once the user has their media devices connected and running using their home local area network, they will also want to be able to access their content stored on those media devices from remote locations. To address this need, the consumer electronics companies currently prefer a solution that extends the DLNA standard outside the home via UPnP remote access. The current UPnP remote access standard specifies mechanisms that make it possible to extend the home LAN so that it logically includes remote devices located outside the home LAN. The current UPnP Remote Access standard is entitled "Remote Access Architecture: 2. For UPnP™ Version 1.0, Status: Standardized DCP; Date: Apr. 30, 2011; Document Version: 1.0; Service Template Version: 2.00". The contents of this document are incorporated by reference herein.

Referring to FIG. 1 (PRIOR ART), there is a diagram illustrating the traditional UPnP architecture that allows UPnP devices 102 of one home LAN 104 to be accessible to UPnP devices 106 of another home LAN 108 and vice-versa. In this home-to-home scenario, the two home LANs 104 and 108 respectively include Remote Access Discovery Agents 110 and 112 (RADAs 110 and 112) which are connected to one another by an access network 114. The UPnP Remote Access standard outlines how pairs of RADAs 110 and 112 can bridge the two home LANs 104 and 108 (both UPnP domains). In particular, each RADA 110 and 112 is configured at installation (usually of a physical device) to talk to its corresponding RADA 110 and 112. This configuration also requires bidirectional data flow between the two home LANS 104 and 108.

The current UPnP Remote Access standard's approach falls short in terms of usability and quality of service. For instance, by requiring pairs of RADAs 110 and 112 to be preemptively configured to communicate with each other and only each other results in a rigid system that is ill suited for dealing with the dynamic, on-demand nature of today's networks. Additionally, by requiring pairs of RADAs 110 and 112 to be configured to communicate with each other also creates issues with scalability since each RADA 110 and 112 must be independently configured. Moreover, the bidirectional data flow requirement is often unnecessary and less secure than unidirectional data flow especially in situations where a user does not want to broadcast their devices or information to a third party who only needs to send information to the user. Furthermore, the current UPnP Remote Access standard does not permit the user to access their home devices from an unknown peer (network) such as a friend's personal computer or via a hotel television. Accordingly, there has been and is a need to address these problems and other problems in order to enhance how a user can remotely access a device which is located within their home LAN (or some other home LAN). These needs and other needs are satisfied by the present invention.

SUMMARY

A system, a controller, and methods for enabling a user of a user device to remotely access a device are described in the independent claims of the present application. Advantageous embodiments of the system, the controller, and the methods for enabling a user of a user device to remotely access a device have been described in the dependent claims of the present application.

In one aspect, the present invention provides a system for enabling a user of a user device to remotely access a device. The system comprises a controller and at least one computer, where each computer supports multiple remote access discovery agents, and each computer is configured to service multiple local area networks. The controller is operatively coupled to the at least one computer and further comprises an input interface configured to receive a request from the user device to set up a bridge between one of the local area networks known as a visited network and another one of the local area networks known as a home network. The user device is connected to the visited network. The controller also comprises an output interface configured to send a first control message to the computer that services the visited network to have that computer instantiate one of the remote access discovery agents located therein to communicate with another one of a plurality of remote access discovery agents associated with one of the computers that services the home network. The output interface is also configured to send a second control message to the computer that services the home network to have that computer instantiate the another one remote access discovery agent. The instantiated one remote access discovery agent and the instantiated another one remote access discovery agent allows proxying between the visited network and the home network so the user device is able to remotely access the device associated with the home network. An advantage of the system is that the computer(s) allow more flexibility (not having to prearrange RADA pairs), more scalability (able to have as many RADAs as needed for a situation), more efficiency (only send messages in relevant directions), and more security (don't blindly broadcast all information from home LAN to visited LAN).

In another aspect, the present invention provides a controller for enabling a user of a user device to remotely access a device by controlling one or more computers, where each computer supports multiple remote access discovery agents, and where each computer is configured to service multiple local area networks. The controller comprising an input interface configured to receive a request from the user device to set up a bridge between one of the local area networks known as a visited network and another one of the local area networks known as a home network. The user device is connected to the visited network. The controller further comprising an output interface configured to send a first control message to the computer that services the visited network to have that computer instantiate one of the remote access discovery agents located therein to communicate with another one of a plurality of remote access discovery agents associated with one of the computers that services the home network. The output interface is further configured to send a second control message to the computer that services the home network to have that computer instantiate the another one remote access discovery agent, where the instantiated one remote access discovery agent and the instantiated another one remote access discovery agent allows proxying between the visited network and the home network so the user device can remotely access the device associated with the home network. An advantage of the controller is that by controlling the computer(s) it allows more flexibility (not having to prearrange RADA pairs), more scalability (able to have as many RADAs as needed for a situation), more efficiency (only send messages in relevant directions), and more security (don't blindly broadcast all information from home LAN to visited LAN).

In yet another aspect, the present invention provides a method implemented by a controller for enabling a user of a user device to remotely access a device by controlling one or more computers, where each computer comprises multiple remote access discovery agents, and where each computer is configured to service multiple local area networks. The method comprising the steps of: (1) receiving, at the controller, a request from the user device to set up a bridge between one of the local area networks known as a visited network and another one of the local area networks known as a home network, wherein the user device is connected to the visited network; (2) sending, from the controller, a first control message to the computer that services the visited network to have that computer instantiate to one of the remote access discovery agents located therein to communicate with another one of a plurality of remote access discovery agents associated with one of the computers that services the home network; and (3) sending, from the controller, a second control message to the computer that services the visited network to have that computer instantiate the another one remote access discovery agent, where the instantiated one remote access discovery agent and the instantiated another one remote access discovery agent allows proxying between the visited network and the home network so the user device is able to remotely access the device associated with the home network. An advantage of the method is that by controlling the computer(s) it allows more flexibility (not having to prearrange RADA pairs), more scalability (able to have as many RADAs as needed for a situation), more efficiency (only send messages in relevant directions), and more security (don't blindly broadcast all information from home LAN to visited LAN).

In still yet another aspect, the present invention provides a computer that is configured to service multiple local area networks. The computer comprising an input interface, a plurality of remote access discovery agents, and one or more output interfaces connected to the local area networks. The input interface configured to receive a control message and upon receipt of the control message configure one of the remote access discovery agents to communicate with one of the local area networks known as a home network. The one remote access discovery agent comprises a peer unit that obtains information about one or more devices in the home network. The one or more output interfaces is configured to transmit the obtained information about one or more devices in the home network. An advantage of the computer is that it allows more flexibility (not having to prearrange RADA pairs), more scalability (able to have as many RADAs as needed for a situation), more efficiency (only send messages in relevant directions), and more security (don't blindly broadcast all information).

In still yet another aspect, the present invention provides a computer that is configured to service multiple local area networks. The computer comprising an input interface, a plurality of remote access discovery agents, and one or more output interfaces connected to the plurality of local area networks. The input interface is configured to receive a control message and upon receipt of the control message configure one of the remote access discovery agents to communicate with one of the local area networks known as a visited network. The one remote access discovery agent comprises a brain unit that receives information from another remote access discovery agent about one or more devices in another local area network known as a home network and then creates messages for broadcast to one or more devices in the visited network so the one or more devices in the visited network are informed about the one or more devices in the home network. An advantage of the computer is that it allows more flexibility (not having to prearrange RADA pairs), more scalability (able to have as many RADAs as needed for a situation), more efficiency (only send messages in relevant directions), and more security (don't blindly broadcast all information).

In still yet another aspect, the present invention provides a method for enabling a user of a user device located in a visited local area network to remotely access a device located in a home local area network. The method is implemented by the user device and comprises the steps of: (a) connecting the user device to the visited local area network; (b) initiating a first remote access application in the user device to send a request to a controller to set up a bridge between the visited local area network and a home local area network, wherein the controller performs following: (1) send a first control message to a computer that services the visited local area network to have that computer instantiate one of a plurality of remote access discovery agents located therein to communicate with another one of a plurality of remote access discovery agents associated with a computer that services the home local area network; and (2) send a second control message to the computer that services the home local area network to have that computer instantiate the another one remote access discovery agent; (c) initiating a second remote access application in the user device to perform following steps: (i) discovering one or more devices associated with the home local area network utilizing the instantiated one remote access discovery agent and the instantiated another one remote access discovery agent; (ii) locating a list of content which is stored in one of the one or more devices associated with the home local area network; (iii) displaying the list of content stored in one of the one or to more devices associated with the home local area network; and (iv) selecting one piece of content stored in one of the one or more devices associated with the home local area network, where the selected piece of content is transmitted through the instantiated one remote access discovery agent and the instantiated another one remote access discovery agent and displayed on a device associated with the visited local area network. An advantage of the method is that by controlling the computer(s) it allows more flexibility (not having to prearrange RADA pairs), more scalability (able to have as many RADAs as needed for a situation), more efficiency (only send messages in relevant directions), and more security (don't blindly broadcast all information from home LAN to visited LAN).

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 2-3 are diagrams illustrating the basic components of an exemplary system configured for enabling a user of a user device (e.g., smart phone, tablet, laptop) which is located in a visited LAN to remotely access a device which is located in a home LAN in accordance with an embodiment of the present invention;

FIGS. 11A-11D are a sequence of diagrams used to explain one scenario where a user utilizes their user device while located in a visited LAN to remotely access a content store in a device which is located in a home LAN so they can transfer content from the device in the home LAN to a device located in the visited LAN in accordance with an embodiment of the present invention; and FIG. 12 is a flowchart illustrating the steps of an exemplary method for enabling a user of a user device located in a visited LAN to remotely access a device located in a home LAN in accordance with an embodiment of the present invention.

DETAILED DESCRIPTION

Figure 2B:
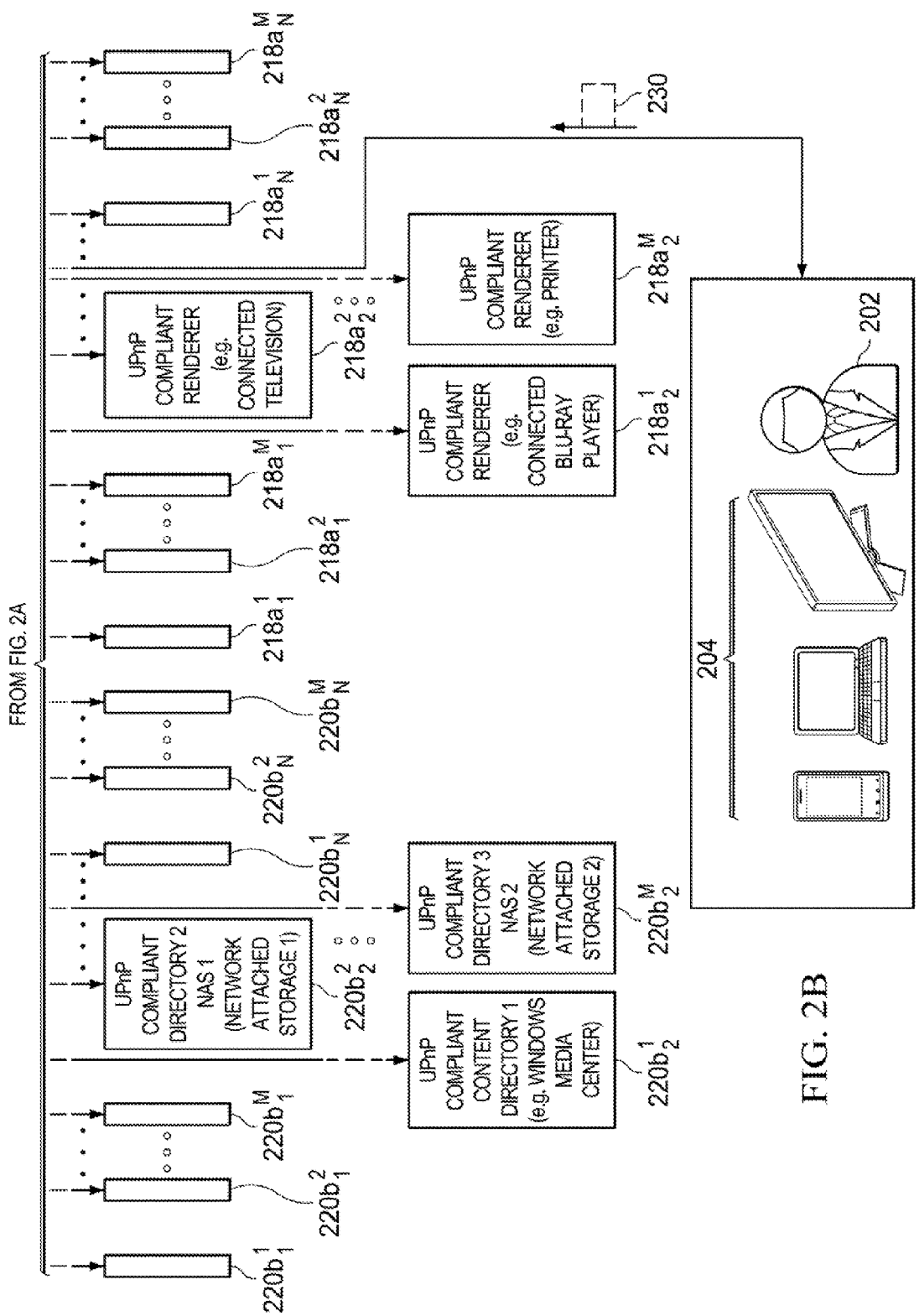

Referring to FIGS. 2A-2B, there are diagrams illustrating the basic components of an exemplary system 200 configured for enabling a user 202 of a user device 204 (e.g., smart phone, tablet, laptop) which is located in a visited LAN $214a_2$ (e.g., visited LAN $214a_2$) to remotely access a device $220b_2{}^2$ which is located in a home LAN $216b_2$ (e.g., home LAN $216b_2$) in accordance with an embodiment of the present invention. The exemplary system 200 includes a controller 206 and one or more computers 208a and 208b (two shown). In this example, the controller 206 is directly coupled to the computers 208a and 208b but the controller 206 could be coupled to the computers 208a and 208b by an access network (e.g., Internet)(e.g., access network 210a, access network 210b, or any other access network). Each computer 208a and 208b incorporates an input interface 201, a processor 203, a memory 205, and an output interface 207. Furthermore, each computer 208a and 208b respectively incorporates multiple RADAs $212a_1, 212a_2 \ldots 212a_n$ and $212b_1, 212b_2 \ldots 212b_n$ which as discussed below are created as needed. Plus, each computer 208a and 208b respectively services via access networks 210a and 210b multiple LANs $214a_1, 214a_2 \ldots 214a_n$ and $216b_1, 216b_2 \ldots 216b_n$. The LANs $214a_1, 214a_2 \ldots 214a_n$ and $216b_1, 216b_2 \ldots 216b_n$ each respectively service one or more UPnP compliant devices $218a_1{}^1, 218a_1{}^2 \ldots 218a_1{}^m$, $218a_2{}^1, 218a_2{}^2 \ldots 218a_2{}^m, 218a_n{}^1, 218a_n{}^2 \ldots 218a_n{}^m$, and $220b_1{}^1, 220b_1{}^2 \ldots 220b_1{}^m, 220b_2{}^1, 220b_2{}^2 \ldots 220b_2{}^m$, $220b_n{}^1, 220b_n{}^2 \ldots 220b_n{}^m$. For instance, the UPnP compliant devices can be any type of device including a Windows media center, a networked attached storage device, a blue-ray player, a television, a printer etc. . . . The computers 208a and 208b are shown to be coupled to their respective LANs $214a_1$, $214a_2 \ldots 214a_n$ and $216b_1, 216b_2 \ldots 216b_n$ by their respective access networks 210a and 210b (e.g., internal ISP networks) but could be connected to them by any other well known means. In order for the RADAs $212a_1, 212a_2 \ldots 212a_n$ and $212b_1, 212b_2 \ldots 212b_n$ to function, the computers 208a and 208b will need to have access to multicast packets coming from the LANs $214a_1, 214a_2 \ldots 214a_n$ and $216b_1, 216b_2 \ldots 216b_n$. Since, the access networks currently deployed typically prevent the propagation of multicast outside of a customer's home. This means that the ISP will most likely need to deploy networking configurations that enable the customer's messages (e.g., UPnP SSDP messages) to propagate from the LANs $214a_1, 214a_2 \ldots 214a_n$ and $216b_1, 216b_2 \ldots 216b_n$ to the computers 208a and 208b. The system 200 may include or interface with other well known devices but for clarity only the components which are needed to explain and enable the present invention have been described in detail herein.

In this example, assume the user 202 is utilizing the user device 204 (e.g., smart phone, tablet, laptop) currently located in the visited LAN $214a_2$ (for example their friend's home, hotel etc. . . . ) and wants to remotely access the UPnP compliant device $220b_2{}^2$ (e.g., NAS 1) which is located in the home LAN $216b_2$ (for example their house). The controller 206 includes an input interface 222, a processor 224, a memory 226, and an output interface 228. The processor 224 interfaces with the memory 226 which stores processor-executable instructions to execute those processor-executable instructions to enable the input interface 222 to receive a request 230 from the user device 204 to set up a bridge between the visited LAN $214a_2$ and the home LAN $216b_2$. The processor 224 also executes the processor-executable instructions to process the request 230 and have the output interface 228 send a first control message 232 to the computer 208a that services the visited LAN $214a_2$ to have that computer 208a instantiate one RADA 212a, (for example) located therein to communicate with another RADA $212b_2$ (for example) associated with the computer 208b that services the home LAN $216b_2$. The processor 224 also executes the processor-executable instructions to process the request 230 and have the output interface 228 send a second control message 234 to the computer 208b that services the home LAN $216b_2$ to have that computer 208b instantiate one RADA $212b_2$ (for example) located therein to communicate with another RADA $212a_1$ (for example) associated with the computer 208a that services the visited LAN $214a_2$. The instantiated RADA 212a, and the instantiated RADA $212b_2$ allows proxying of device advertisements and searches between the visited LAN $214a_2$ and the home LAN $216b_2$ so the user 202 can use their user device 204 to remotely access one of the devices $220b_2^2$ (for example) associated with the home LAN $216b_2$. For example, the user 202 may want to use their user device 204 to remotely access and control device $220b_2^2$ so they can transfer content from that device $220b_2^2$ to one of the devices $218a_2^2$ (for example) located in the visited LAN $214a_2$. Once, the user 202 has finished remotely accessing the device $220b_2^2$, the processor 224 executes the processor-executable instructions to have the output interface 228 send deactivate messages 233 and 235 to the computers 208a and 208b to have them deactivate the RADAs $212a_1$ and $212b_2$. The resources formerly used by the deactivated RADAs are recycled for use in other tasks of computer 208a. A detailed discussion about how the instantiated RADAs $212a_1$ and $212b_2$ allow proxying of device advertisements and searches between the visited LAN $214a_2$ and the home LAN $216b_2$ so the user 202 can use their user device 204 to remotely access and control the device $220b_2^2$ in the home LAN $216b_2$ is provided below with respect to FIG. 3.

Referring to FIG. 3, there is a detailed diagram of the computers 208a and 208b which is used to explain how the instantiated RADAs $212a_1$ and $212b_2$ allows proxying between the visited LAN $214a_2$ and the home LAN $216b_2$ so the user 202 can use their user device 204 to remotely access and control one of the devices $220b_2^2$ (for example) associated with the home LAN $216b_2$. When the two LANs $214a_2$ and $216b_2$ are bridged by the computers 208a and 208b and in particular when the instantiated RADAs 212a, and $212b_2$ are bridged the RADA $212a_1$ creates a brain object 304a and RADA $212b_2$ creates a peer object 302b. Within the instantiated RADA $212b_2$, the peer object 302b is created to relay information about the home LAN $216b_2$. In particular, the peer object 302b is responsible for transmitting updates about the one or more UPnP compliant devices $220b_2^1, 220b_2^2 \ldots 220b_2^m$ in the home LAN $216b_2$ to the brain object 304a inside the instantiated RADA $212a_1$. As the brain object 304a receives updates about the home LAN $216b_2$ it creates messages for broadcast in the visited LAN $214a_2$ so that the UPnP compliant devices $218a_2^1, 218a_2^2 \ldots 218a_2^m$ and user device 204 will be informed about the UPnP compliant devices $220b_2^1, 220b_2^2 \ldots 220b_2^m$ in the home LAN $216b_2$. The brain object 304a is also used to answer queries received from the UPnP compliant devices $218a_2^1, 218a_2^2 \ldots 218a_2^m$ and user device 204 in the visited LAN $214a_2$ since those devices are unable to query the home LAN $216b_2$ (recall the peer object 302b is supposed to keep the brain object 304a updated with accurate information about of the home LAN $216b_2$). If desired, the instantiated RADA $212b_2$ can have additional peer object(s) relaying updates about the local UPnP compliant devices $220b_2^1, 220b_2^2 \ldots 220b_2^m$ to additional brain object(s) where each additional brain object would be located in a RADA other than instantiated RADA $212a_1$. In other words, one peer object communicates with only one brain object. This is true in any scenario.

Figure 4B:
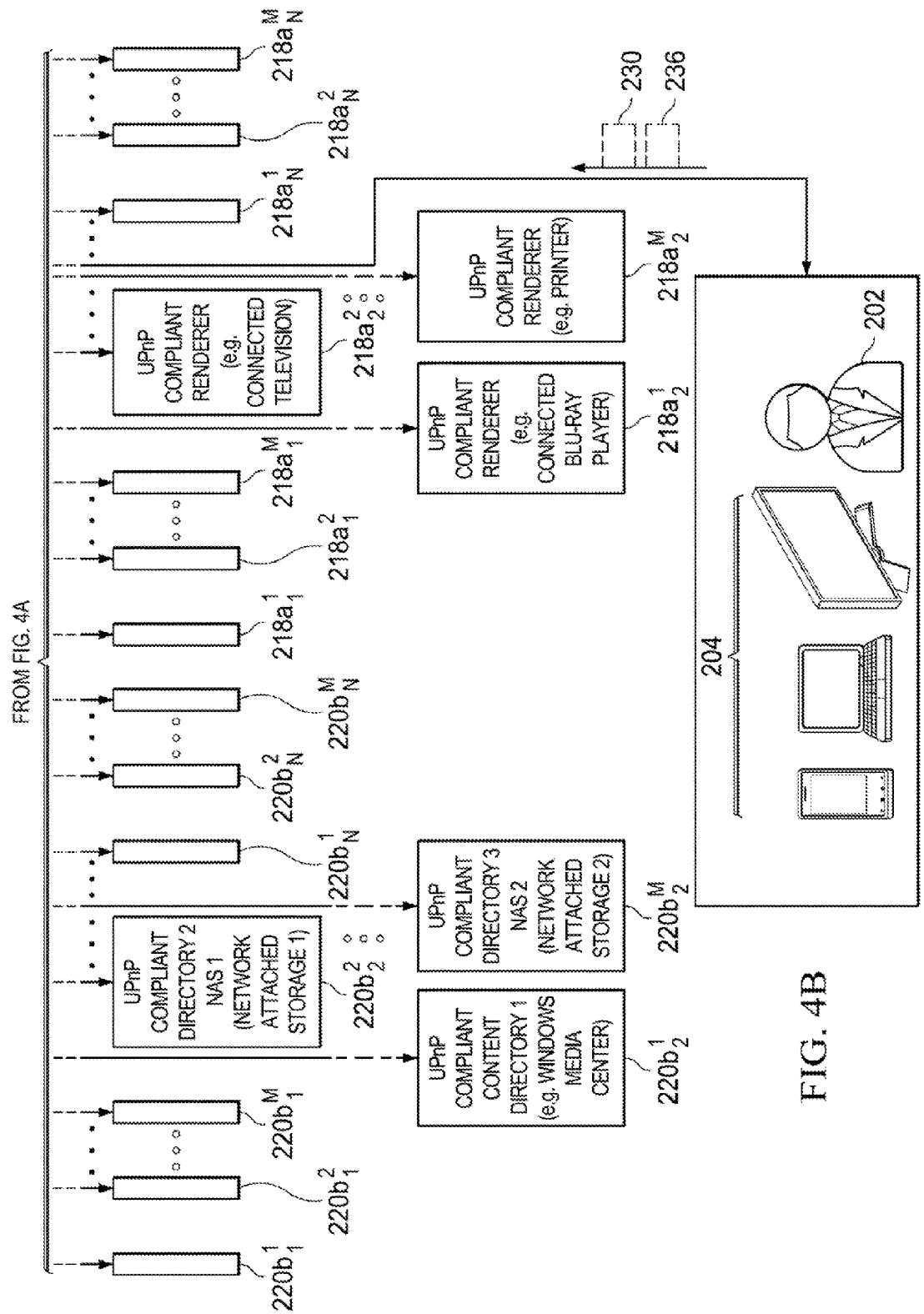
FIGS. 4-5 are diagrams illustrating the basic components of the exemplary system which is configured for enabling a user to use their user device while attached to a visited LAN to remotely access and control one of the devices associated with a home LAN and at the same time remotely access and control one of the devices associated with another home LAN in accordance with an embodiment of the present invention.

Referring to FIGS. 4A-4B, there are detailed diagrams used to explain an exemplary scenario where the user 202 could use their user device 204 while attached to the visited LAN $214a_2$ to remotely access and control one of the devices $220b_2^2$ (for example) associated with the home LAN $216b_2$ and at the same time remotely access and control one of the devices $220b_1^1$ (for example) associated with the home LAN $216b_1$. To accomplish this, the controller 206 would receive a request 230 from the user device 204 to set up a bridge between the visited LAN $214a_2$ and the home LAN $216b_2$. Then, the controller's processor 224 would execute the processor-executable instructions to process the request 230 and have the output interface 228 send a control message 232 to the computer 208a that services the visited LAN $214a_2$ to have that computer 208a instantiate one RADA $212a_1$ (for example) located therein to communicate with another RADA $212b_2$ (for example) associated with the computer 208b that services the home LAN $216b_2$. The controller's processor 224 would also send a control message 234 to the computer 208b that services the home LAN $216b_2$ to have that computer 208b instantiate one RADA $212b_2$ (for example) located therein to communicate with another RADA $212a_1$ (for example) associated with the computer 208a that services the visited LAN $214a_2$. The instantiated RADA $212a_1$ and the instantiated RADA $212b_2$ allows proxying of device advertisements and searches between the visited LAN $214a_2$ and the home LAN $216b_2$ so the user 202 can use their user device 204 to remotely access one of the devices $220b_2^2$ (for example) associated with the home LAN $216b_2$.

Then, assume the user 202 also wants to remotely access and control one of the devices $220b_1^1$ (for example) associated with the home LAN $216b_1$. The controller 206 would receive another request 236 from the user device 204 to set up a bridge between the visited LAN $214a_2$ and the home LAN $216b_1$. The controller's processor 224 would execute the processor-executable instructions to process the request 236 and have the output interface 228 send a control message 237 to the computer 208a that services the visited LAN $212a_2$ to have that computer 208a configure previously instantiated RADA $212a_1$ to communicate with another RADA $212b_n$ (for example) associated with the computer 208b that services the home LAN $216b_1$. The controller's processor 224 would also send a control message 238 to the computer 208b that services the home LAN $216b_1$ to have that computer 208b instantiate another RADA $212b_n$ (for example) located therein to communicate with RADA $212a_1$ (for example) associated with the computer 208a that services the visited LAN $214a_2$. The instantiated RADA $212a_1$ and the instantiated RADA $212b_n$ allows proxying of device advertisements and searches between the visited LAN $214a_2$ and the home LAN $216b_1$ so the user 202 can use their user device 204 to remotely access one of the devices $220b_1^1$ (for example) associated with the home LAN $216b_1$. In this example, the user 202 may want to use their user device 204 to remotely access and control device $220b_2^2$ so they can transfer content from that device $220b_2^2$ to one of the devices $218a_2^2$ (for example) located in the visited LAN $214a_2$. And, at the same time the user 202 may want to use their user device 204 to remotely access and control device $220b_1^{\ 1}$ so they can transfer content from that device $220b_1^{\ 1}$ to one of the devices $218a_2^{\ 1}$ (for example) located in the visited LAN $214a_2$.

Figure 5A:
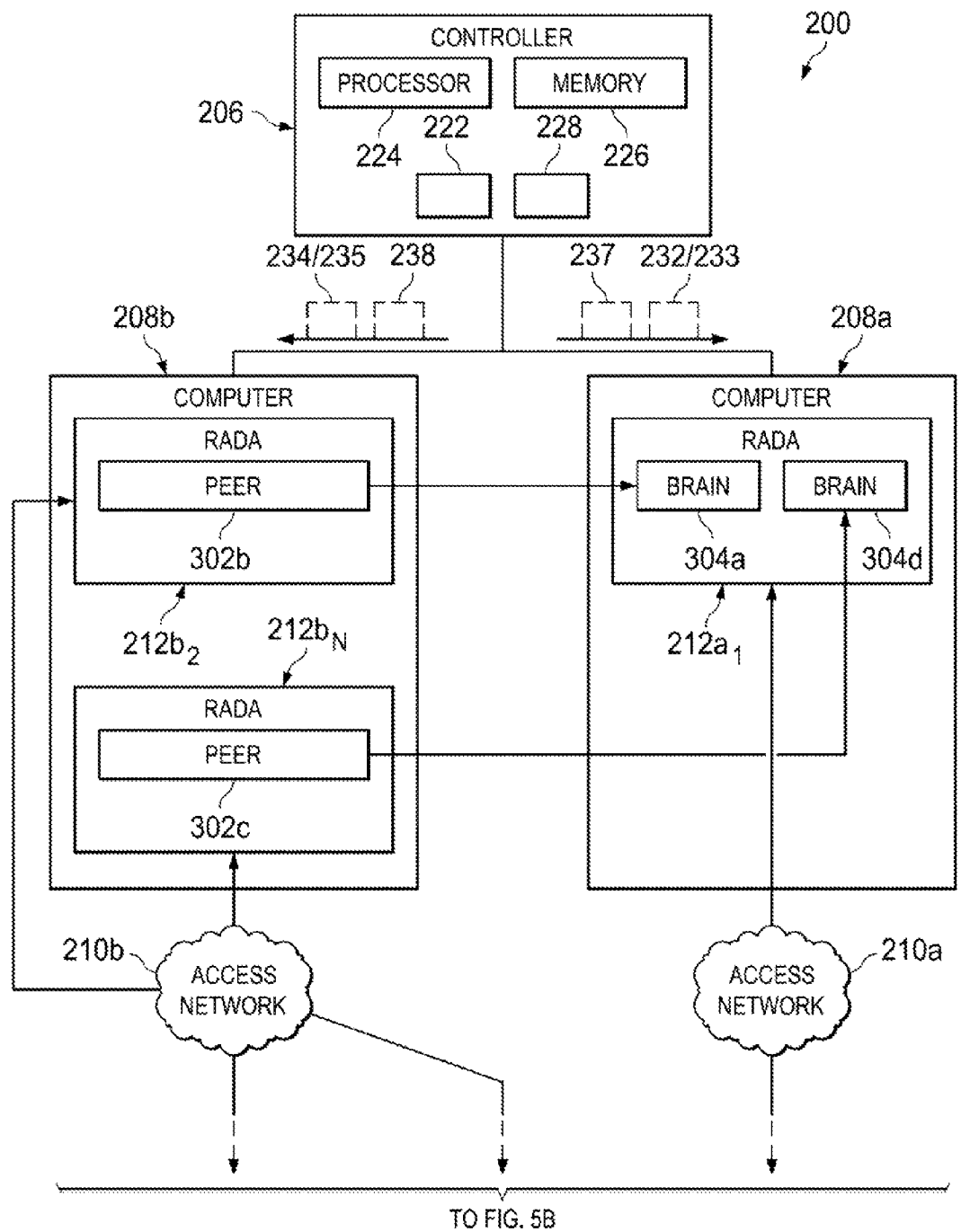
Figure 5B:
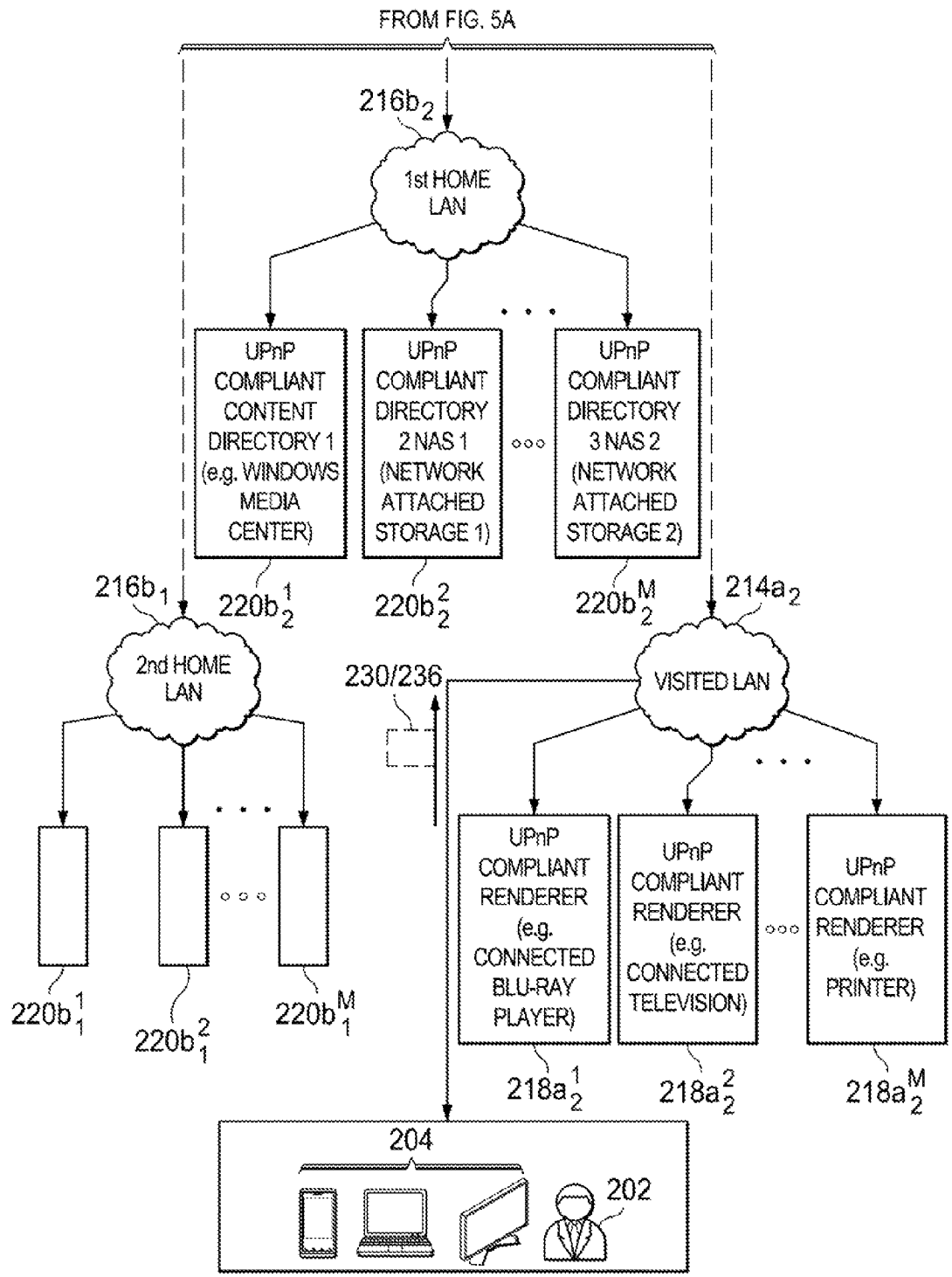

Once, the user 202 has finished remotely accessing the devices $220b_2^{\ 2}$ and $220b_1^{\ 1}$, the processor 224 executes the processor-executable instructions to have the output interface 228 send deactivate messages 233 and 235 to the computers 208a and 208b to have them deactivate the RADAs $212a_1$, $212b_2$ and $212b_n$. The resources previously in use by the deactivated RADAs are recycled for use by other tasks of computers 208a and 208b. A detailed discussion about how the instantiated RADAs $212a_1$, $212b_2$ and $212b_n$ allow proxying of device advertisements and searches between the visited LAN $212a_2$ and the home LANs $216b_2$ and $216b_1$ so the user 202 can use their user device 204 to remotely access and control the devices $220b_2^{\ 2}$ and $220b_1^{\ 1}$ in the home LANs $216b_2$ and $216b_1$ is provided below with respect to FIGS. 5A-5B Referring to FIGS. 5A-5B, there are detailed diagrams of the computers 208a and 208b which is used to explain how the instantiated RADAs $212a_1$, $212b_2$ and $212b_n$ allow proxying of device advertisements and searches between the visited LAN $212a_2$ and the home LANs $216B_2$ and $216b_1$ so the user 202 can use their user device 204 to remotely access and control the devices $220b_2^{\ 2}$ and $220b_1^{\ 1}$ in the home LANs $216b_2$ and $216b_1$. When the visited LAN $214a_2$ is bridged to the two home LANs $216b_2$ and $216b_1$ by the computers 208a and 208b and in particular when the instantiated RADAs $212a_1$, $212b_2$ and $212b_n$ are bridged then RADA $212a_1$ creates brain objects 304a and 304d, RADA $212b_2$ creates peer object 302b and RADA $212b_n$ creates peer object 302c. Within the instantiated RADA $212b_2$, the peer object 302b is created to relay information about the home LAN $216b_2$ and the brain object 304a within RADA $212a_1$ is created to receive and memorize information from peer object 302b regarding the home LAN $216b_2$ so that the information can be made available to the visited LAN $214a_2$. In particular, the peer object 302b is responsible for transmitting updates about the one or more UPnP compliant devices $220b_2^{\ 1}, 220b_2^{\ 2} \ldots 220b_2^{\ m}$ in the home LAN $216b_2$ to the brain object 304a inside the instantiated RADA $212a_1$. As the brain object 304a receives updates about the home LAN $216b_2$ it creates messages for broadcast in the corresponding visited LANs $214a_2$ so that the UPnP compliant devices $218a_2^{\ 1}, 218a_2^{\ 2} \ldots 218a_2^{\ m}$ and user device 204 will be informed about the UPnP compliant devices $220b_2^{\ 1}, 220b_2^{\ 2} \ldots 220b_2^{\ m}$ in the home LAN $216b_2$. The brain object 304a is also used to answer queries received from the UPnP compliant devices $218a_2^{\ 1}, 218a_2^{\ 2} \ldots 218a_2^{\ m}$ and user device 204 in the visited LAN $214a_2$ because those devices are unable to directly query the home LAN $216b_2$. Recall: the peer object 302b is supposed to keep the brain object 304a updated with accurate information about of the home LAN $216b_2$). Likewise, within the instantiated RADA $212b_n$, the peer object 302c is created to relay information about the home LAN $216b_1$ and the brain object 304d within RADA $212a_1$ is created to receive and memorize information from peer object 302c regarding the home LAN $216b_1$ so that the information can be made available to the visited LAN $214a_2$. In particular, the peer object 302c is responsible for transmitting updates about the one or more UPnP compliant devices $220b_1^{\ 1}, 220b_1^{\ 2} \ldots 220b_1$m in the home LAN $216b_1$ to the brain object 304d inside the instantiated RADA $212a_1$. As the brain object 304d receives updates about the home LAN $216b_1$ it creates messages for broadcast in the corresponding visited LANs $214a_2$ so that the UPnP compliant devices $218a_2^{\ 1}, 218a_2^{\ 2} \ldots 218a_2^{\ m}$ and user device 204 will be informed about the UPnP compliant devices $220b_1^{\ 1}, 220b_1^{\ 2} \ldots 220b_1^{\ m}$ in the home LAN $216b_1$. The brain object 304d is also used to answer queries received from the UPnP compliant devices $218a_2^{\ 1}, 218a_2^{\ 2} \ldots 218a_2^{\ m}$ and user device 204 in the visited LAN $214a_2$ because those devices are unable to directly query the home LAN $216b_1$. Recall: the peer object 302c is supposed to keep the brain object 304d updated with accurate information about of the home LAN $216b_1$).

Figure 6B:
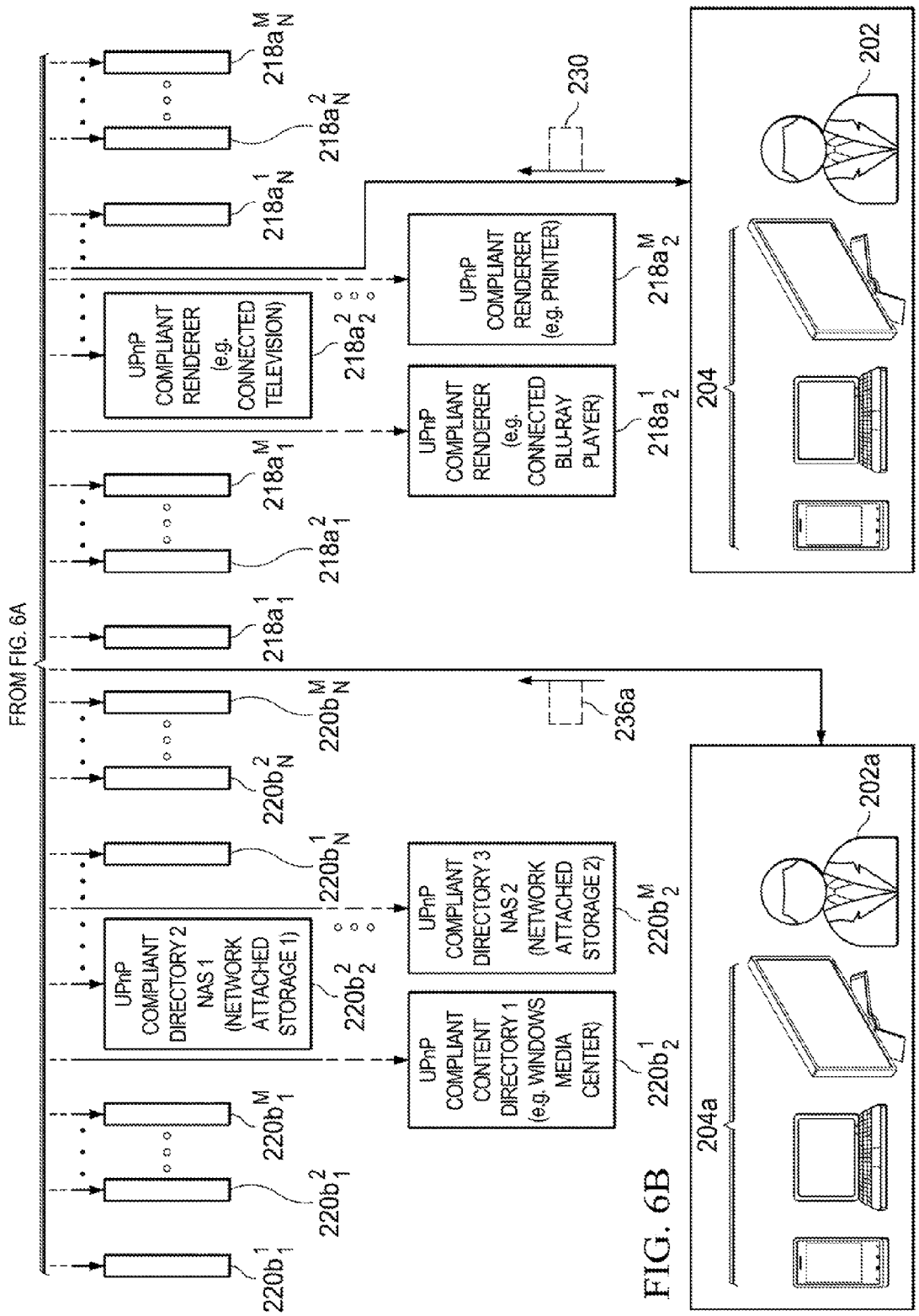
FIGS. 6-7 are diagrams illustrating the basic components of the exemplary system which is configured for enabling a user to use their user device while attached to a visited LAN to remotely access and control one of the devices associated with a home LAN and at the same time another user could use their user device while attached to another visited LAN to remotely access and control one of the devices associated with the home LAN in accordance with an embodiment of the present invention.

Referring to FIGS. 6A-6B, there are detailed diagrams used to explain an exemplary scenario where the user 202 could use their user device 204 while attached to the visited LAN $214a_2$ to remotely access and control one of the devices $220b_2^{\ 2}$ (for example) associated with the home LAN $216b_2$ and at the same time another user 202a could use their user device 204a while attached to another visited LAN $216b_n$ (for example) to remotely access and control one of the devices $220b_2^{\ 1}$ (for example) associated with the home LAN $216b_2$. To accomplish this, the controller 206 would receive a request 230 from the user device 204 to set up a bridge between the visited LAN $214a_2$ and the home LAN $216b_2$. Then, the controller's processor 224 would execute the processor-executable instructions to process the request 230 and have the output interface 228 send a control message 232 to the computer 208a that services the visited LAN $214a_2$ to have that computer 208a instantiate one RADA $212a_1$ (for example) located therein to communicate with another RADA $212b_2$ (for example) associated with the computer 208b that services the home LAN $216b_2$. The controller's processor 224 would also send a control message 234 to the computer 208b that services the home LAN $216b_2$ to have that computer 208b instantiate one RADA $212b_2$ (for example) located therein to communicate with another RADA $212a_1$ (for example) associated with the computer 208a that services the visited LAN $214a_2$. The instantiated RADA $212a_1$ and the instantiated RADA $212b_2$ allows proxying of device advertisements and searches between the visited LAN $214a_2$ and the home LAN $216b_2$ so the user 202 can use their user device 204 to remotely access one of the devices $220b_2^{\ 2}$ (for example) associated with the home LAN $216b_2$.

Then, assume during the same time period that the other user 202a uses their user device 204a while attached to another visited LAN $216b_n$ (for example) to remotely access and control one of the devices $220b_2^{\ 1}$ (for example) associated with the home LAN $216b_2$. The controller 206 would receive another request 236a from the user device 204a to set up a bridge between the visited LAN $216b_n$ and the home LAN $216b_2$. The controller's processor 224 would execute the processor-executable instructions to process the request 236a and have the output interface 228 send a control message 237a to the computer 208b that services the visited LAN $216b_n$ to have that computer 208b instantiate RADA $212b_n$ (for example) to communicate with another RADA $212b_2$ (for example) associated with the computer 208b that services the home LAN $216b_2$. The controller's processor 224 would also send a control message 238a to the computer 208b that services the home LAN $216b_2$ to have that computer 208b configure previously-instantiated RADA $212b_2$ (for example) located therein to communicate with RADA $212b_n$ (for example) associated with the computer 208b that services the visited LAN $216b_n$. The instantiated RADA $212b_2$ and the instantiated RADA $212b_n$ allows proxying of device advertisements and searches between the visited LAN $216b_n$ and the home LAN $216b_2$ so the user 202a can use their user device 204a to remotely access one of the devices $220b_2^{\ 1}$ (for example) associated with the home LAN $216b_2$. In this example, the user 202a may want to use their user device 204a to remotely access and control device $220b_2^{\ 1}$ so they can transfer content from that device $220b_2^1$ to one of the devices $220b_n^2$ (for example) located in the visited LAN $216b_n$. And, at the same time the user 202 may want to use their user device 204 to remotely access and control device $220b_2^2$ so they can transfer content from that device $220b_2^2$ to one of the devices $218a_2^1$ (for example) located in the visited LAN $214a_2$.

Once, the user 202 has finished remotely accessing the device $220b_2^2$, the processor 224 executes the processor-executable instructions to have the output interface 228 send a deactivate message 233a to the computer 208a to deactivate the RADA $212a_1$. Also, when user 202a has finished remotely accessing the device $220b_2^2$, the processor 224 executes the processor-executable instructions to have the output interface 228 send a deactivate message 233b to the computer 208b to deactivate the RADA $212b_n$ and $212b_2$. The resources formerly used by deactivated RADAs $212a_1$, $212b_2$ and $212b_n$ are recycled for use by other tasks on computers 208a and 208b. A detailed discussion about how the instantiated RADAs $212a_1$, $212b_2$ and $212b_n$ allow proxying of device advertisements and searches between the visited LANs $212a_2$ and $216b_n$ and the home LAN $216b_2$ so the users 202 and 202a can use their user devices 204 and 204a to remotely access and control the devices $220b_2^1$ and $220b_2^2$ (for example) in the home LAN $216b_2$ is provided below with respect to FIGS. 7A-7B.

Figure 7B:
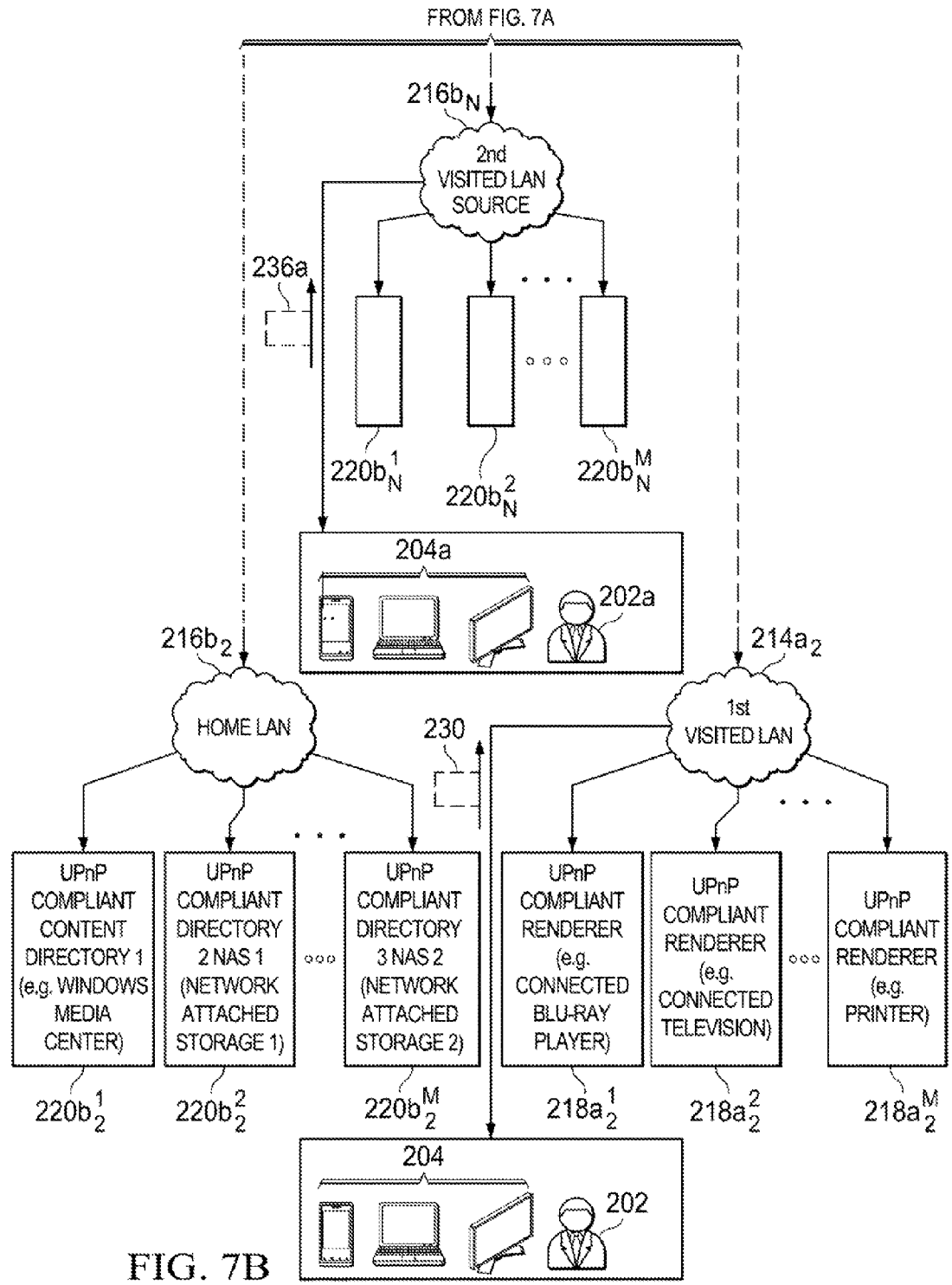

Referring to FIGS. 7A-7B, there are detailed diagrams of the computers 208a and 208b which is used to explain how the instantiated RADAs $212a_1$, $212b_2$ and $212b_n$ allow proxying of device advertisements and searches between the visited LANs $214a_2$ and $216b_n$ and the home LAN $216b_2$ so the users 202 and 202a can use their user devices 204 and 204a to remotely access and control the devices $220b_2^1$ and $220b_2^2$ (for example) in the home LAN $216b_2$. When the visited LANs $212a_2$ and $216b_n$ are bridged to the home LAN $216b_2$ by the computers 208a and 208b and in particular when the instantiated RADAs $212a_1$, $212b_2$ and $212b_n$ are bridged then RADA $212a_1$ creates a brain object 304a, RADA $212b_2$ creates peer objects 302b and 302c, and RADA $212b_n$ creates brain object 304d. Within the instantiated RADA $212b_2$, the peer object 302b is created to relay information about the home LAN $216b_2$. In particular, the peer object 302b is responsible for transmitting updates about the one or more UPnP compliant devices $220b_2^1$, $220b_2^2$ ... $220b_2^m$ in the home LAN $216b_2$ to the brain object 304a inside the instantiated RADA $212a_1$. As the brain object 304a receives updates about the home LAN $216b_2$ they create messages for broadcast in the visited LAN $214a_2$ so that the UPnP compliant devices $218a_2^1$, $218a_2^2$ ... $218a_2^m$ and user device 204 will be informed about the UPnP compliant devices $220b_2^1$, $220b_2^2$ ... $220b_2^m$ in the home LAN $216b_2$. The brain object 304a is also used to answer queries received from the UPnP compliant devices $218a_2^1$, $218a_2^2$ ... $218a_2^m$ and user device 204 in the visited LAN $214a_2$ because they are unable to directly query the home LAN $216b_2$ (recall: the peer object 302b is supposed to keep the brain object 304a updated with accurate information about of the home LAN $216b_2$). Likewise, the peer object 302c is responsible for transmitting updates about the one or more UPnP compliant devices $220b_2^1$, $220b_2^2$ ... $220b_2^m$ in the home LAN $216b_2$ to the brain object 304d inside the instantiated RADA $212b_n$. As the brain object 304d receives updates about the home LAN $216b_2$ they create messages for broadcast in the visited LAN $216b_n$ so that the UPnP compliant devices $220b_n^1$, $220b_n^2$ ... $220b_n^m$ and user device 204a will be informed about the UPnP compliant devices $220b_2^1$, $220b_2^2$ ... $220b_2^m$ in the home LAN $216b_2$. The brain object 304d is also used to answer queries received from the UPnP compliant devices $220b_n^1$, $220b_n^2$ ... $220b_n^m$ and user device 204a in the visited LAN $216b_n$ because they are unable to directly query the home LAN $216b_2$ (recall: the peer object 302c is supposed to keep the brain object 304d updated with accurate information about of the home LAN $216b_2$).

Figure 8B:
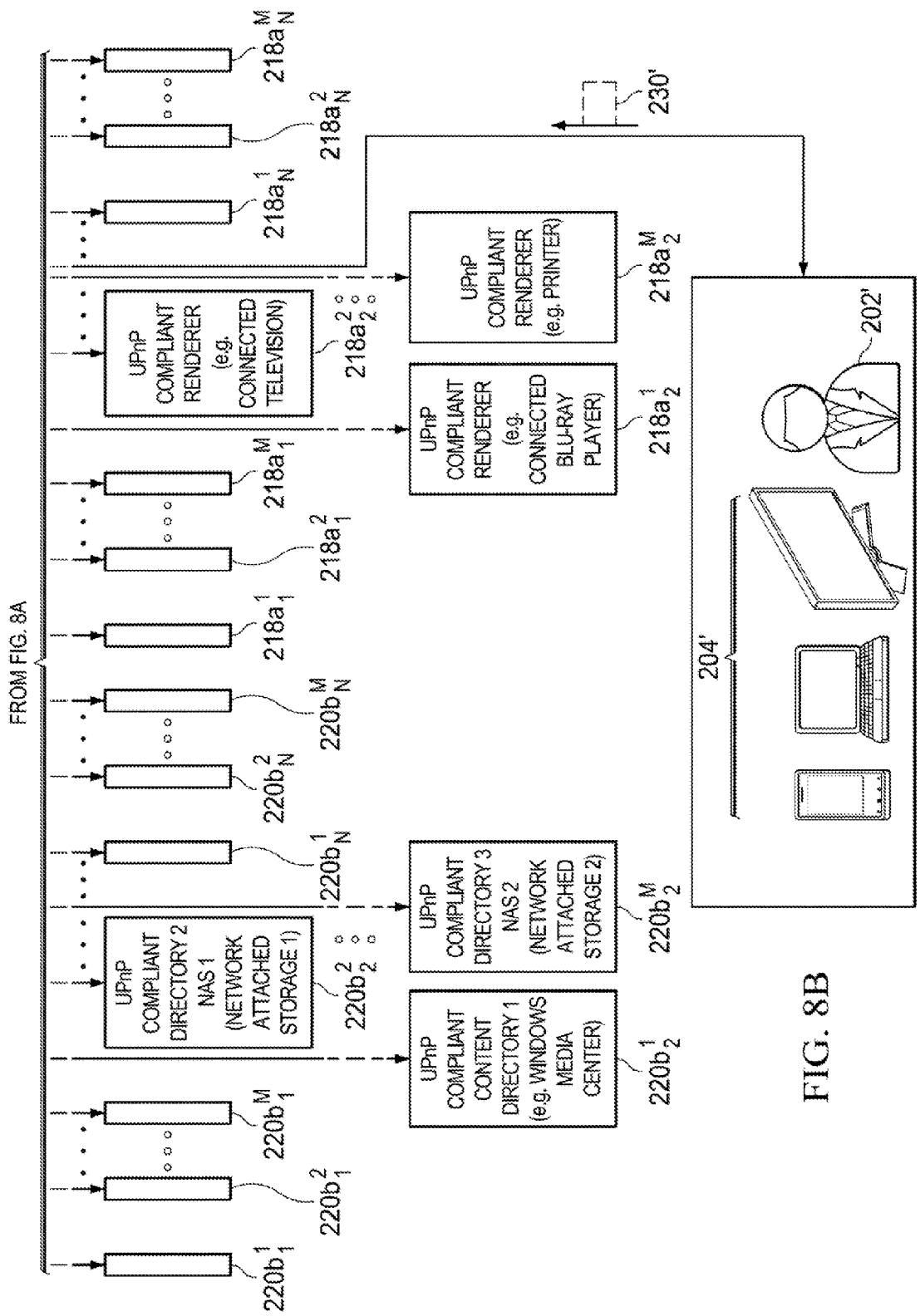
FIGS. 8-9 are diagrams illustrating the basic components of an exemplary system which is configured for enabling a user of a user device which is located in a visited LAN to remotely access a device which is located in a home LAN in accordance with an embodiment of the present invention.

Referring to FIGS. 8A-8B, there are diagrams illustrating the basic components of the exemplary system 200 used to explain an exemplary scenario in which another user 202' is utilizing their user device 204' while currently located in the visited LAN $214a_2$ (for example their friend's home, hotel etc. . . . ) and wants to remotely access the UPnP compliant device $218a_1^1$ (for example) which is located in the home LAN $214a_1$ (for example their home LAN $214a_1$). In this example, the computer 208a services both of these LANs $214a_1$ and $214a_2$ and would instantiate two RADAs $212a_2$ and $212a_n$ to allow proxying of device advertisements and searches between the visited LAN $214a_2$ and the home LAN $214a_1$ so the user 202' can use their user device 204' to remotely access and control the device $218a_1^1$ in the home LAN$214a_1$. For example, the user 202' may want to use their user device 204' to remotely access and control device $218a_1^1$ so they can transfer content from that device $218a_1^1$ to one of the devices $218a_2^2$ (for example) located in the visited LAN $214a_2$. To accomplish this, the controller 206 would receive a request 230' from the user device 204' to set up a bridge between the visited LAN $214a_2$ and the home LAN $214a_1$. Then, the controller's processor 224 would execute the processor-executable instructions to process the request 230' and have the output interface 228 send a control message 232' to the computer 208a that services both the visited LAN $214a_2$ and the home LAN $214a_1$ to have that computer 208a instantiate one RADA $212a_2$ (for example) to communicate with another RADA $212a_n$ (for example). The instantiated RADAs $212a_2$ and $212a_n$ allow proxying of device advertisements and searches between the visited LAN $214a_2$ and the home LAN $214a_1$ so the user 202' can use their user device 204' to remotely access one of the devices $218a_1^1$ (for example) associated with the home LAN $214a_1$. Once, the user 202' has finished remotely accessing the device $218a_1^1$, the processor 224 executes the processor-executable instructions to have the output interface 228 send a deactivate message 233' to the computer 208a to deactivate the RADAs $212a_2$ and $212a_n$. The resources formerly used by the deactivated RADAs $212a_2$ and $212a_n$ can be recycled for use by other tasks of computer 208a. A detailed discussion about how the instantiated RADAs $212a_2$ and $212a_n$ allow proxying of device advertisements and searches between the visited LAN $214a_2$ and the home LAN $214a_1$ so the user 202' can use their user device 204' to remotely access and control the device $218a_1^1$ in the home LAN $214a_1$ is provided below with respect to FIGS. 9A-9B.

Figure 9B:
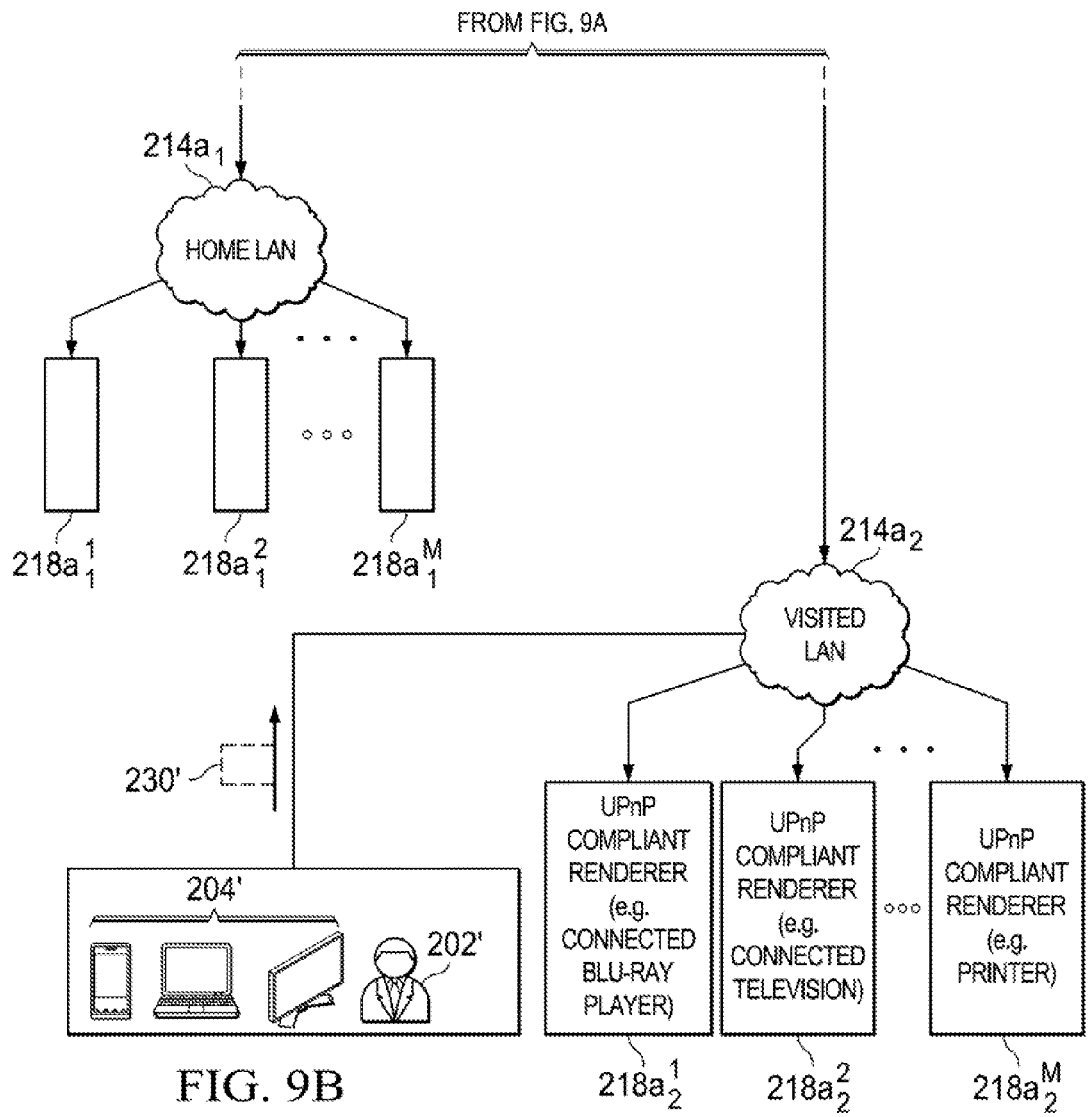

Referring to FIGS. 9A-9B, there are detailed diagram of the computer 208a which is used to explain how the instantiated RADAs $212a_2$ and $212a_n$ allows proxying of device advertisements and searches between the visited LAN $214a_2$ and the home LAN $214a_1$ so the user 202' can use their user device 204' to remotely access and control one of the devices $218a_1^1$ (for example) associated with the home LAN $214a_1$. When the two LANs $214a_2$ and $214a_1$ are bridged by the computer 208a and in particular when the instantiated RADAs $212a_2$ and $212a_n$ are bridged then RADA $212a_2$ creates brain object 304a' and RADA $212a_n$ creates peer object 302b'. Within the instantiated RADA $212a_n$, the peer object 302b' is created to relay information about the home LAN $214a_1$. In particular, the peer object 302b' is responsible for transmitting updates about the one or more UPnP compliant devices $218a_1^1$, $218a_1^2$ ... $218a_1^m$ in the home LAN $214a_1$ to the brain object $304a'$ inside the instantiated RADA $212a_2$. As the brain object $304a'$ receives updates about the home LAN $214a_1$ it creates messages for broadcast in the visited LAN $214a_2$ so that the UPnP compliant devices $218a_2{}^1, 218a_2{}^2 \ldots 218a_2{}^m$ and user device $204'$ will be informed about the UPnP compliant devices $218a_1{}^1, 218a_1{}^2 \ldots 218a_1{}^m$ in the home LAN $214a_1$. The brain object $304a'$ is also used to answer queries received from the UPnP compliant devices $218a_2{}^1, 218a_2{}^2 \ldots 218a_2{}^m$ and the user device $204'$ in the visited LAN $214a_2$ as they cannot directly query the home LAN $214a_1$ (recall: the peer object $302a'$ is supposed to keep the brain object $304b'$ updated with accurate information about of the home LAN $214a_1$). If desired, the instantiated RADA $212a_n$ can have additional peer to object(s) relaying updates about the local UPnP compliant devices $218a_1{}^1, 218a_1{}^2 \ldots 218a_1{}^m$ to additional brain object(s) where each additional brain object would be located in a RADA other than the instantiated RADA $212a_2$. In other words, one peer object communicates with only one brain object. This is true in any scenario.

From the foregoing, one skilled in the art will readily appreciate with the description provided herein that the aforementioned system 200, the controller 206, and the computers $208a$ and $208b$ effectively enable the user(s) $202, 202', 202a$ of user device(s) $204, 204'$ and $204a$ to remotely access device(s) $220b_2{}^1, 220b_1{}^2, 220b_2{}^1$ and $218a_1{}^1$ which is/are located home LANs $216b_2, 216b_1, 214a_1$. In addition, the skilled person with the teachings herein will readily appreciate that the computers $208a$ and $208b$ (e.g., RADA hives $208a$ and $208b$) are a marked improvement over the prior art in that the computers $208a$ and $208b$ aggregate multiple RADAs $212a_1, 212a_2 \ldots 212a_n$ and $212b_1, 212b_2 \ldots 212b_n$ which serve multiple LANs $214a_1, 214a_2 \ldots 214a_n$ and $216b_1, 216b_2 \ldots 216b_n$ (multiple households) and dynamically bridge and deactivate pairs of RADAs as users $202, 202'$ and $202a$ move from place to place. In effect, the present invention enables a small number of computers $208a$ and $208b$ to replace a large number of traditional RADA servers (e.g, 10 computers could replace 5000 traditional RADA servers).

In particular, the system 200 described herein has a group of RADAs $212a_1, 212a_2 \ldots 212a_n$ and $212b_1, 212b_2 \ldots 212b_n$ which are organized into computers $208a$ and $208b$ (e.g., RADA hives $208a$ and $208b$) that function to support one or more separate UPnP LANs $214a_1, 214a_2 \ldots 214a_n$ and $216b_1, 216b_2 \ldots 216b_n$. Each computer $208a$ and $208b$ has the potential to host one or more (virtual) RADAs, as needed (up to one RADA for each interface on the server machine). As a new RADA is needed, it is automatically configured to talk to its target RADA (which may be already established, or created at the same time) across a network. As RADAs become unnecessary, they can be deactivated and their resources recycled. Because of this flexibility, the data can flow in a single direction (a RADA can be configured to receive information about remote UPnP LAN networks, but not to transmit its own info). An important feature of the system 200 is that a single computer $208a$ or $208b$ can support a large number of directly-attached local area networks and properly segregate the device sets.

In an exemplary generic scenario, if a user 202 decides to set up a proxy between UPnP LAN networks A and B. The user asks a controller 206 (RADA HIVE coordinator machine 206) to set up a bridge. The controller 206 (RADA HIVE coordinator machine 206) then has the computer $208a$ (RADA hive X $208a$) attached to network A to instantiate a RADA on eth7, configured to talk to a RADA known by computer $208b$ (RADA hive Y $208b$). Then, the controller 206 (RADA HIVE coordinator machine 206) has the computer $208b$ (RADA hive Y $208b$) attached to network B instantiate a RADA on eth99, configured to talk to the RADA known by computer $208a$ (RADA hive X $208a$). Then, the two paired RADAs allow proxying between UPnP LAN networks A and B.

In the event, the bridging local networks A and B are supported by the same computer $208a$ or $208b$ (RADA hive X or RADA hive Y) a data structure is created referencing network A and B so that the controlling computer $208a$ or $208b$ knows that Simple Service Discovery Protocol (SSDP) NOTIFY messages must be copied from one network A to the other network B. The SSDP NOTIFY message functions to advertise the existence of an UPnP-compliant device. This is a marked improvement over the prior art in which the RADAs existed in separate devices whose configuration was not easily adjusted, and sometimes were only configurable from the home network and not from a visited network. The controlling computer $208a$ or $208b$ also configures the software therein such that M-SEARCH messages for non-local UPnP devices are answered directly by the controlling computer $208a$ or $208b$ from its memory of previously-advertised devices. The M-SEARCH messages function to discover the existence of UPnP devices even if the querant was not listening to the network when the most recent NOTIFY was transmitted. A difference between the present invention and the prior art is that the UPnP RADA (SOAP) RPCs can sometimes be replaced by local procedure calls when the virtual RADA is in the same RADA Hive as the virtual RADAs for the rest of the directly-attached networks. Whereas, in the prior art the RADAs were always separate computers on various networks and the SOAP RPCs were unavoidable.

In the event, the bridging networks A and B are supported by different computers $208a$ and $208b$ (RADA hive X or RADA hive Y) then the controller 206 instructs each computer $208a$ and $208b$ to create data structures referencing network A and B and the computers $208a$ and $208b$ perform the UPnP SOAP calls according to the prior art UPnP RADA specification.

Figure 1:
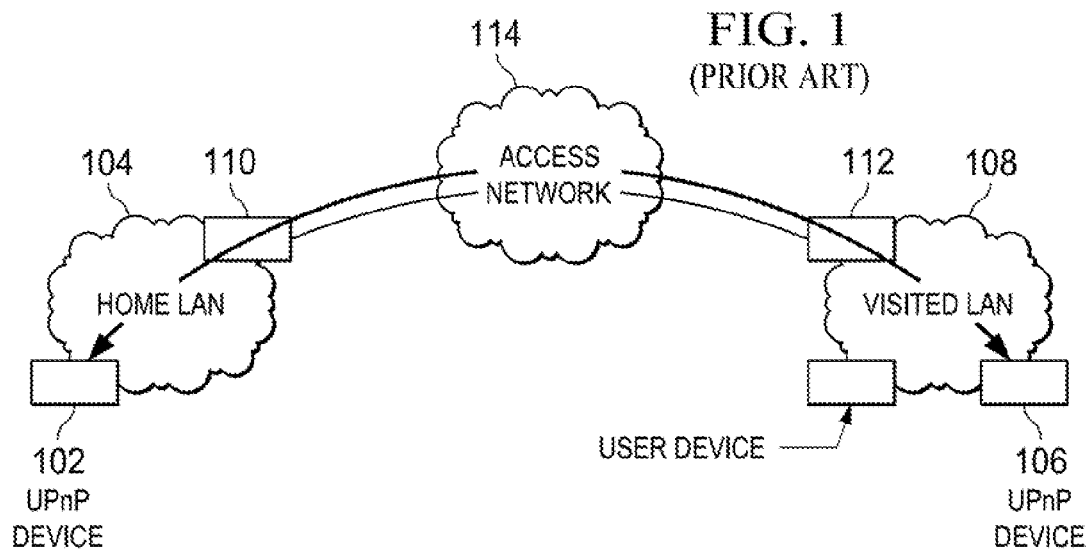
FIG. 1 (PRIOR ART) is a diagram illustrating a traditional UPnP architecture which allows the UPnP devices of one home LAN to be accessible to the UPnP devices of another home LAN and vice-versa.
Figure 10:
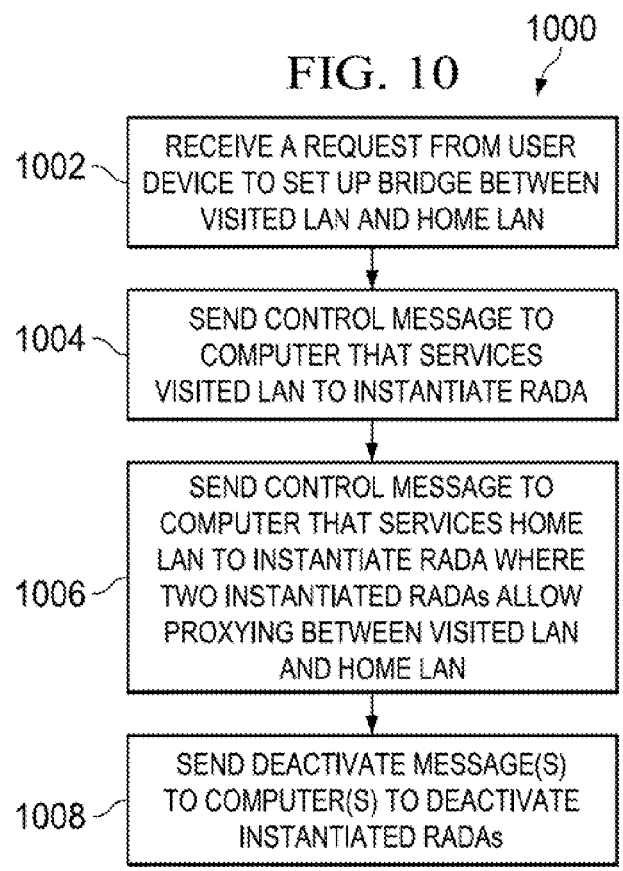
FIG. 10 is a flowchart illustrating the steps of an exemplary method that is implemented by a controller (RADA hive coordinator machine) for enabling a user to use their user device to remotely access a device in accordance with an embodiment of the present invention.

Referring to FIG. 10, there is a flowchart illustrating the steps of an exemplary method 1000 that is implemented by the controller 206 for enabling a user 202 (for example) of a user device 204 to remotely access a device $220b_2{}^2$ (for example) by controlling one or more computers $208a$ and $208b$, where each computer $208a$ and $208b$ comprises a plurality of RADAs $212a_1, 212a_2 \ldots 212a_n$ and $212b_1, 212b_2 \ldots 212b_n$, and where each computer $208a$ and $208b$ is configured to service a plurality of LANs $214a_1, 214a_2 \ldots 214a_n$ and $216b_1, 216b_2 \ldots 216n$. At step 1002, the controller 206 receives a request 230 from the user device 204 to set up a bridge between a visited LAN $214a_2$ (for example) and a home LAN $216b_2$ (for example). In this case, the user device 204 is connected to the visited LAN $214a_2$. At step 1004, the controller 206 sends a first control message 232 to the computer $208a$ that services the visited LAN $214a_2$ to have that computer $208a$ instantiate RADA $212a_1$ (for example) located therein to communicate with another RADA $212b_2$ (for example) associated with the computer $208b$ that services the home LAN $216b_2$. At step 1006, the controller 206 sends a second control message 234 to the computer $208b$ that services the home LAN $216b_2$ to have that computer $208b$ instantiate one RADA $212b_2$ (for example) located therein to communicate with another RADA $212a_1$ (for example) associated with the computer $208a$ that services the visited LAN $214a_2$. The instantiated RADA $212a_1$ and the instantiated RADA $212b_2$ allows proxying of device advertisements and searches between the visited LAN $214a_2$ and the home LAN $216b_2$ so the user 202 can use their user device 204 to remotely access one of the devices $220b_2{}^2$ (for example)

associated with the home LAN $216b_2$. For example, the user 202 may want to use their user device 204 to remotely access and control device $220b_2{}^2$ so they can transfer content from that device $220b_2{}^2$ to one of the devices $218a_2{}^2$ (for example) located in the visited LAN $214a_2$. Once, the user 202 has finished remotely accessing the device $220b_2{}^2$, the controller 206 at step 1008 sends deactivate messages 233 to and 235 to the computers 208a and 208b to have them deactivate the RADAs $212a_1$ and $212b_2$. Thereafter, the resources previously used by the deactivateed RADAs $212a_1$ and $212b_2$ can be recycled for use by other tasks on computers 208a and 208b.

Referring to FIGS. 11A-11D, there are illustrated a sequence of diagrams used to explain one scenario where the user 1100 (e.g., Alice) utilizes their user device 1102 (e.g., Alice's smartphone) while located in visited LAN 1104 (e.g., Bob's home) to remotely access a content store in a network attached storage (NAS) device 1106 located in home LAN 1108 (e.g., Alice's home) so they can transfer content from the NAS device 1106 to a television 1110 located in the visited LAN 1104 (e.g., Bob's home). Starting with FIG. 11A, there is a basic diagram illustrating the visited LAN 1104 (e.g., Bob's home) which has the television 1110 connected to a residential gateway 1112. The residential gateway 1112 is connected to a broadband network gateway BNG 1114 (located in the access network 1116) which in this example also supports the home LAN 1108 (e.g., Alice's house). The home LAN 1108 has a residential gateway 1118 coupled to both the BNG 1114 and the NAS device 1106 and most likely other devices within the home LAN 1108. In this example, the aforementioned controller 206 is connected to the aforementioned computer 208a which in turn is connected to the access network 1116 and BNG 1114. It should be appreciated that the controller 206 and computer 208a could be architected and deployed in numerous ways throughout the access network 1116. For instance, the BNG 1114 can be configured to have the features of the controller 206 to control the computer 208a or the computer 208a can be configured to be controlled by the various users 1100. Plus, it should be appreciated that for clarity only the components which are needed to explain this particular scenario and illustrate one of the exemplary implementational use cases of the present invention have been described in detail herein.

Figure 11A:
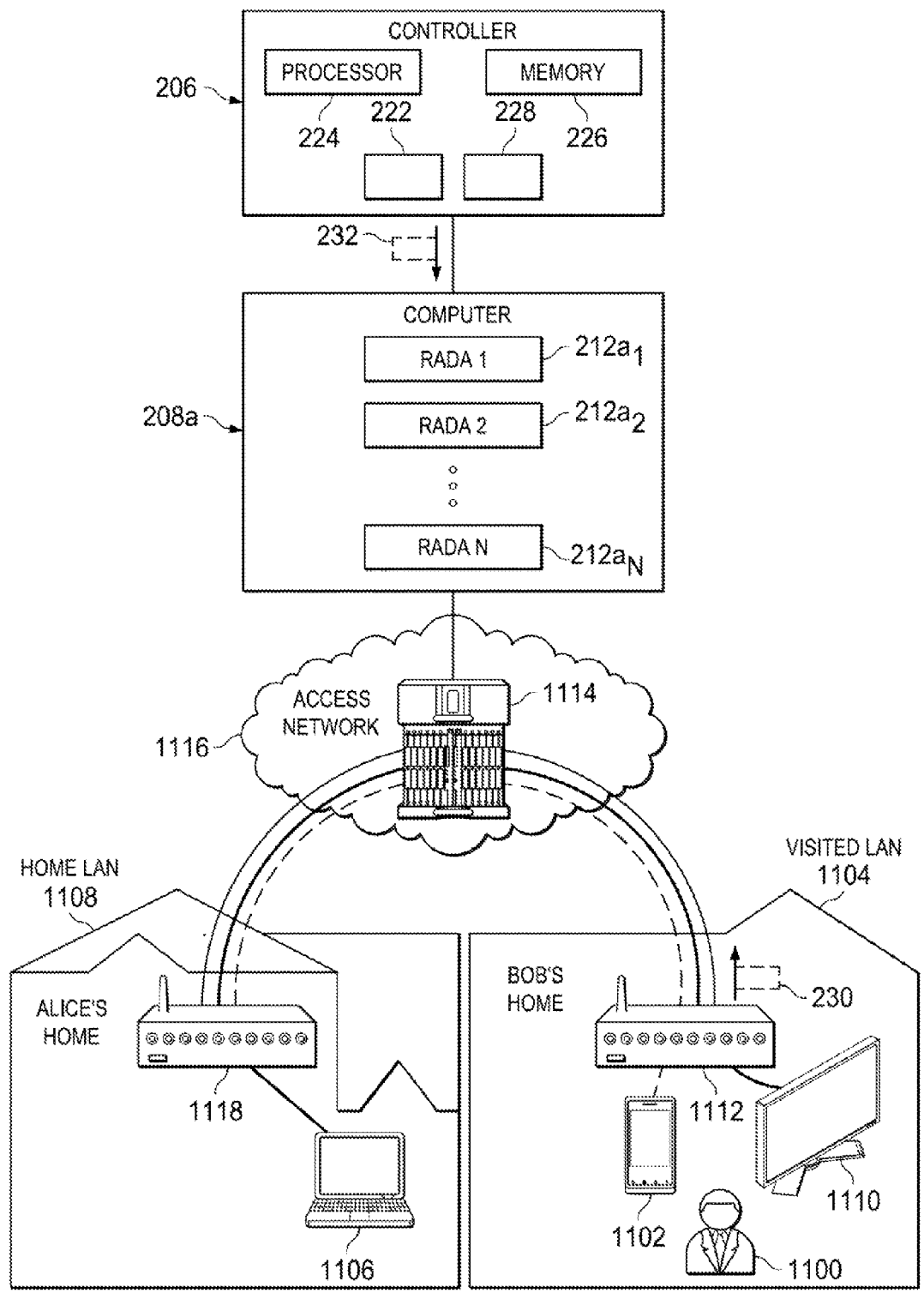
Figure 11C:
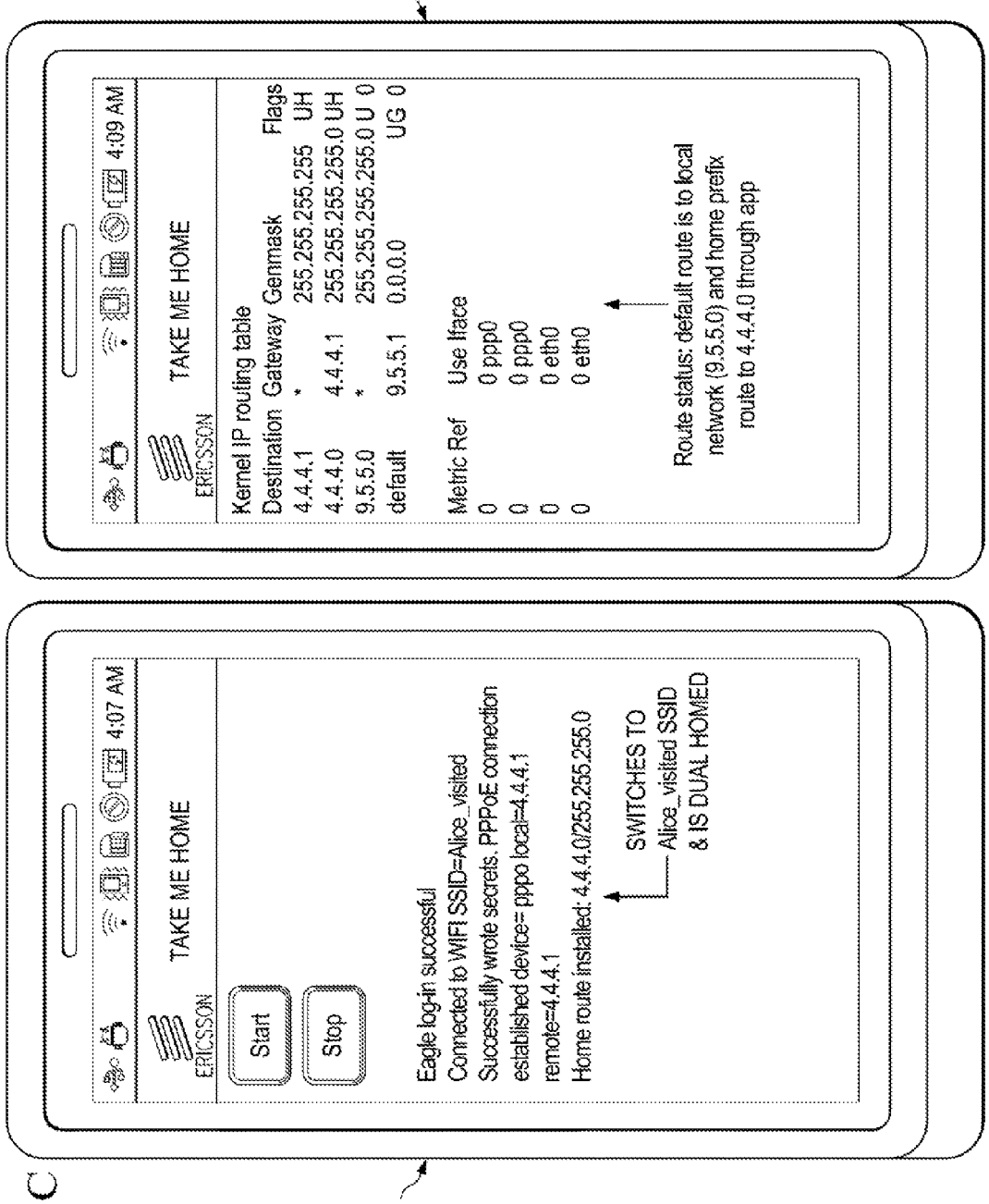
Figures 2, 11D:
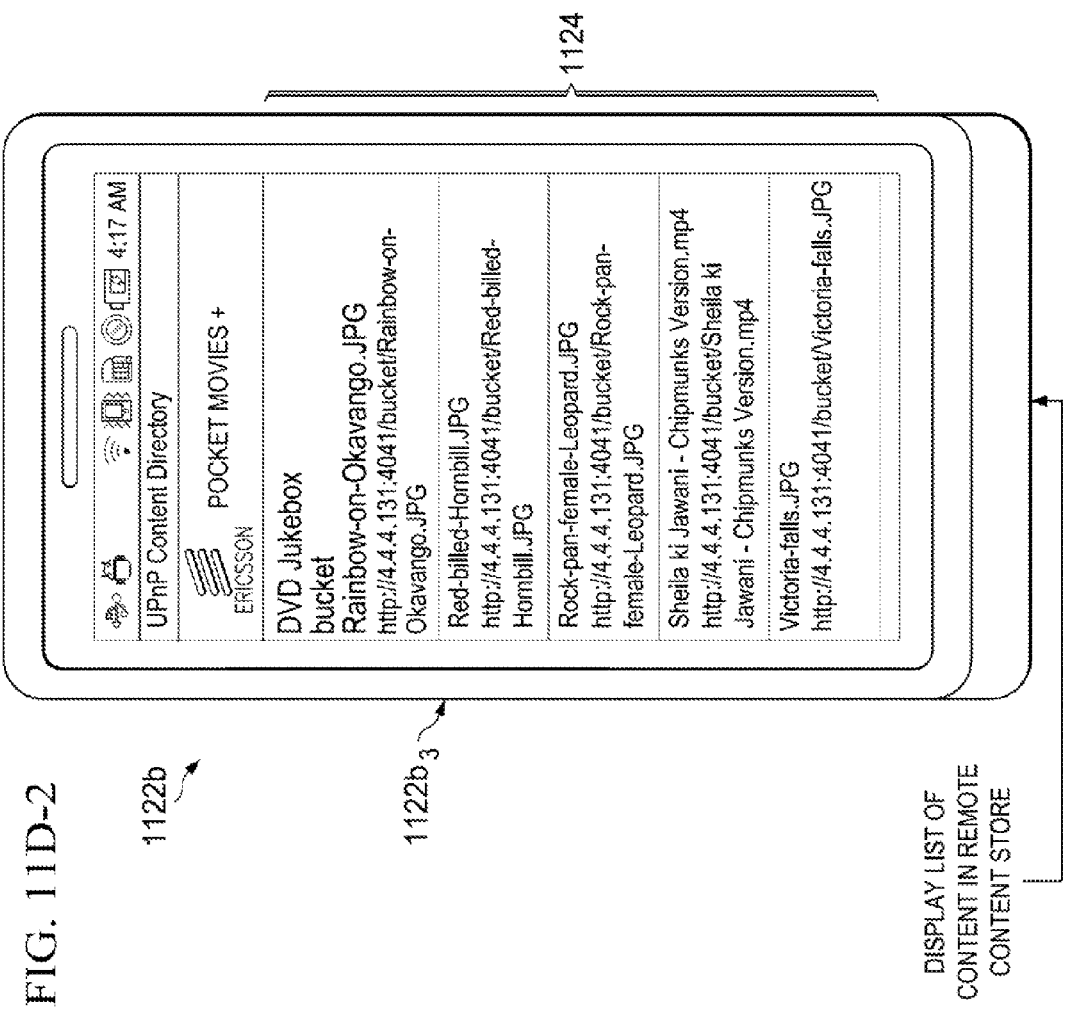

In continuing with this exemplary scenario, FIG. 11B illustrates the various screens 1120a and 1120b that can be displayed on the user device 1102 (e.g., Alice's smartphone). The screen 1120a shows that the user device 1102 is currently connected to the visited LAN 1104. The screen 1120b shows various applications loaded in the user device 1102 and the ones of interest for this discussion are the "TakeMeHome" application 1122a and the "PocketMovies" application 1122b. After, the user 1100 (e.g., Alice) connects the user device 1102 to the visited LAN 1104 they would initiate the "TakeMeHome" application 1122a (see FIG. 11C) which when initiated would send the request 230 to the controller 206 which then would send a control message 232 to the computer 208a to instantiate RADAs $212a_2$ and $212a_n$ to allow proxying of device advertisements and searches between the visited LAN 1104 and the home LAN 1108 (see also discussion with respect to FIGS. 8-9). Then, the user 1100 (e.g., Alice) would as shown in FIG. 11D initiate the "PocketMovies" application 1122b. Once, the "PocketMovies" application 1122b is initiated it would perform as follows: (1) discover the local Television 1110 (see screen $1122b_1$); (2) utilize UPnP remote access to locate the remote content store in the NAS/laptop 1106 (sec screen $1122b_2$); and (3) display a list of content 1124 in the remote content store of the NAS device 116 (see screen $1122b_3$). Then, the user 1100 would select one piece of content in the list of content 1124 to have transferred to and displayed on the television 1110.

Referring to FIG. 12, there is a flowchart illustrating the steps of an exemplary method 1200 for enabling a user 1100 (for example) of a user device 1102 located in a visited LAN 1104 to remotely access a device 1106 located in a home LAN 1108 in accordance with an embodiment of the present invention. At step 1202, the user device 1102 connects to the visited LAN 1104. At step 1204, the user device 1102 initiates a first remote access application 1122a (e.g., "TakeMeHome" application 1122a) to send a request 230 to the controller 206 to set up a bridge between the visited LAN 1104 and the home LAN 1108. As discussed above, the controller 206 upon receiving the request 230 performs following: (1) sends a first control message 232 to the computer 208a or 208b that services the visited LAN 1104 to have that computer 208a or 208b instantiate one of a plurality of RADAs located therein to communicate with another one of a plurality of RADAs associated with a computer 208a or 208b that services the home LAN 1108; and (2) send a second control message 234 to the computer 208a or 208b that services the home LAN 1108 to have that computer 208a or 208b instantiate the another one RADA (see FIGS. 2-9). At step 1206, the user device 1102 initiates a second remote access application 1122b (e.g., "PocketMovies" application 1122b) to perform following steps: (1) discovering one or more devices 1106 associated with the home LAN 1108 utilizing the instantiated one remote access discovery agent and the instantiated another one remote access discovery agent (step 1206a)(see FIG. 11D); (2) locating a list of content 1124 which is stored in one of the one or more devices 1106 associated with the home (step 1206b)(see FIG. 11D); (3) displaying the list of content 1124 stored in one of the one or more devices 1106 associated with the home LAN 1108 (step 1206c)(see FIG. 11D); and (4) selecting one piece of content stored in one of the one or more devices 1106 associated with the home LAN 1108, where the selected piece of content is transmitted through the instantiated one remote access discovery agent and the instantiated another one remote access discovery agent and displayed on a device 1110 associated with the visited LAN 1104 (step 1206d).

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A system for enabling a user of a user device to remotely access a device, the system comprising:
   a controller;
   at least one computer, each computer comprising a plurality of remote access discovery agents, and each computer is configured to service a plurality of local area networks;
   the controller operatively coupled to the at least one computer and further comprising:
   a processor; and,
   a memory that stores processor-executable instructions, wherein the processor interfaces with the memory to execute the processor-executable instructions to enable the following:

receive, by an input interface, a request from the user device to set up a bridge between one of the local area networks known as a visited network and another one of the local area networks known as a home network, wherein the user device is connected to the visited network;

send, by an output interface, a first control message to the computer that services the visited network to have that computer instantiate one of the remote access discovery agents located therein to communicate with another one of a plurality of remote access discovery agents associated with one of the computers that services the home network;

send, by the output interface, a second control message to the computer that services the home network to have that computer instantiate the another one remote access discovery agent, where the instantiated one remote access discovery agent and the instantiated another one remote access discovery agent allows proxying between the visited network and the home network so the user device is able to remotely access the device associated with the home network; and send, by the output interface, a deactivate message to the computer that instantiated the one remote access discovery agent and to the computer that instantiated the another one remote access discovery agent to deactivate the instantiated one remote access discovery agent and the instantiated another one remote access discovery agent.

2. The system of claim 1, wherein:
the instantiated another one remote access discovery agent comprises a peer unit that is configured to relay information about one or more devices in the home network to the instantiated one remote access discovery agent;
the instantiated one remote access discovery agent comprises a brain unit that is configured to receive the information from the peer unit in the instantiated another one remote access discovery agent and create messages for broadcast to one or more devices in the visited local area network so the one or more devices in the visited network are informed about the one or more devices in the home network.

3. The system of claim 2, wherein the brain unit is further configured to answer queries received from the one or more devices in the visited network without querying the home network.

4. The system of claim 1, where the instantiated one remote access discovery agent and the instantiated another one remote access discovery agent allows proxying where data about devices in the visited network is not provided to the home network.

5. The system of claim 1, wherein the visited network and the home network are serviced by the same computer.

6. The system of claim 1, wherein the visited network is serviced by one computer and the home network is serviced by another computer.

7. The system of claim 1, wherein:
the visited network contains one or more Universal Plug and Play (UPnP) compliant devices; and
the home network contains one or more Universal Plug and Play (UPnP) compliant devices.

8. A controller for enabling a user of a user device to remotely access a device by controlling one or more computers, where each computer comprising a plurality of remote access discovery agents, and where each computer is configured to service a plurality of local area networks, the controller comprising:

a processor; and,
a memory that stores processor-executable instructions, wherein the processor interfaces with the memory to execute the processor-executable instructions to enable the following:

receive, by an input interface, a request from the user device to set up a bridge between one of the local area networks known as a visited network and another one of the local area networks known as a home network, wherein the user device is connected to the visited network;

send, by an output interface, a first control message to the computer that services the visited network to have that computer instantiate one of the remote access discovery agents located therein to communicate with another one of a plurality of remote access discovery agents associated with one of the computers that services the home network;

send, by the output interface, a second control message to the computer that services the home network to have that computer instantiate the another one remote access discovery agent, where the instantiated one remote access discovery agent and the instantiated another one remote access discovery agent allows proxying between the visited network and the home network so the user device can remotely access the device associated with the home network; and send by the output interface, a deactivate message to the computer that instantiated the one remote access discovery agent and to the computer that instantiated the another one remote access discovery agent to deactivate the instantiated one remote access discovery agent and the instantiated another one remote access discovery agent.

9. A method implemented by a controller for enabling a user of a user device to remotely access a device by controlling one or more computers, where each computer comprising a plurality of remote access discovery agents, and where each computer is configured to service a plurality of local area networks, the method comprising the steps of:

receiving, at the controller, a request from the user device to set up a bridge between one of the local area networks known as a visited network and another one of the local area networks known as a home network, wherein the user device is connected to the visited network;

sending, from the controller, a first control message to the computer that services the visited network to have that computer instantiate one of the remote access discovery agents located therein to communicate with another one of a plurality of remote access discovery agents associated with one of the computers that services the home network;

sending, from the controller, a second control message to the computer that services the visited network to have that computer instantiate the another one remote access discovery agent, where the instantiated one remote access discovery agent and the instantiated another one remote access discovery agent allows proxying between the visited network and the home network so the user device is able to remotely access the device associated with the home network; and sending, from the controller, a deactivate message to the computer that instantiated the one remote access discovery agent and to the computer that instantiated the another one remote access discovery agent to deactivate the instantiated one remote access discovery agent and the instantiated another one remote access discovery agent.

10. A computer that is configured to service a plurality of local area networks, the computer comprising:
an input interface;
a plurality of remote access discovery agents;
one or more output interfaces connected to the plurality of local area networks; and
a processor; and,
a memory that stores processor-executable instructions, wherein the processor interfaces with the memory to execute the processor-executable instructions to enable the following:
receive, by the input interface, a control message and upon receipt of the control message configure one of the remote access discovery agents to communicate with one of the local area networks known as a visited network, and the one remote access discovery agent comprises a brain unit that is configured to receive information from another remote access discovery agent about one or more devices in another local area network known as a home network and then create messages for broadcast to one or more devices in the visited network so the one or more devices in the visited network are informed about the one or more devices in the home network; and
receive, by the input interface, a deactivate message and upon receipt of the deactivate message deactivate the one remote access discovery agent.

11. The computer of claim 10, wherein the brain unit is further configured to answer queries received from the one or more devices in the visited network.

* * * * *